US007418578B2

United States Patent

(12) United States Patent
(10) Patent No.: US 7,418,578 B2
(45) Date of Patent: Aug. 26, 2008

Nguyen et al.

(54) SIMULTANEOUSLY ASSIGNING CORRESPONDING ENTRY IN MULTIPLE QUEUES OF MULTI-STAGE ENTRIES FOR STORING CONDITION ATTRIBUTES FOR VALIDATING SIMULTANEOUSLY EXECUTED CONDITIONAL EXECUTION INSTRUCTION GROUPS

(75) Inventors: Hung Nguyen, Plano, TX (US); Shannon Wichman, McKinney, TX (US)

(73) Assignee: VeriSilicon Holdings (Cayman Islands) Co. Ltd., Santa Clara, CA (US)

( * ) Notice: Subject to any disclaimer, the term of this patent is extended or adjusted under 35 U.S.C. 154(b) by 123 days.

(21) Appl. No.: 11/273,679

(22) Filed: Nov. 14, 2005

(65) Prior Publication Data

US 2006/0101251 A1 May 11, 2006

Related U.S. Application Data

(62) Division of application No. 10/256,410, filed on Sep. 27, 2002, now Pat. No. 7,020,765.

(51) Int. Cl.
*G06F 9/38* (2006.01)

(52) U.S. Cl. ....................................... 712/218; 712/234

(58) Field of Classification Search ....................... None
See application file for complete search history.

(56) References Cited

U.S. PATENT DOCUMENTS 5,295,249 A 3/1994 Blaner et al.
5,560,028 A 9/1996 Sachs et al.
5,721,854 A 2/1998 Ebcioglu et al.
5,768,500 A 6/1998 Agrawal et al.
5,771,377 A * 6/1998 Ando ......................... 712/239
5,778,246 A * 7/1998 Brennan ...................... 712/23
5,951,696 A 9/1999 Naaseh et al.
6,016,543 A 1/2000 Suzuki et al.
6,240,510 B1 5/2001 Yeh et al.
6,374,346 B1 4/2002 Seshan et al.
6,484,253 B1 11/2002 Matsuo
7,020,765 B2 3/2006 Nguyen et al.
2004/0221138 A1 11/2004 Rosner et al.

* cited by examiner

*Primary Examiner*—Kenneth S Kim

(57) ABSTRACT

A processor is disclosed including several features allowing the processor to simultaneously execute instructions of multiple conditional execution instruction groups. Each conditional execution instruction group includes a conditional execution instruction and a code block specified by the conditional execution instruction. In one embodiment, the processor includes multiple state machines simultaneously assignable to a corresponding number of conditional execution instruction groups. In another embodiment, the processor includes multiple registers for storing marking data pertaining to a number of instructions in each of multiple execution pipeline stages. In another embodiment, the processor includes multiple attribute queues simultaneously assignable to a corresponding number of conditional execution instruction groups. In another embodiment, the processor includes write enable logic and an execution unit. The write enable logic produces write enable signals dependent upon received attributes, and the execution unit saves results of instructions of conditional execution instruction groups dependent upon the write enable signals.

11 Claims, 12 Drawing Sheets

SIMULTANEOUSLY ASSIGNING CORRESPONDING ENTRY IN MULTIPLE QUEUES OF MULTI-STAGE ENTRIES FOR STORING CONDITION ATTRIBUTES FOR VALIDATING SIMULTANEOUSLY EXECUTED CONDITIONAL EXECUTION INSTRUCTION GROUPS

This Application is a Divisional of prior application Ser. No. 10/256,410 filed on Sep. 27, 2002 now U.S. Pat. No. 7,020,765, to Hung Nguyen, et al. The above-listed Application is commonly assigned with the present invention and is incorporated herein by reference as if reproduced herein in its entirety under Rule 1.53(b).

FIELD OF THE INVENTION

This invention relates generally to data processing, and, more particularly, to apparatus for conditionally executing software program instructions.

BACKGROUND OF THE INVENTION

Many modern processors employ a technique called pipelining to execute more software program instructions (instructions) per unit of time. In general, processor execution of an instruction involves fetching the instruction (e.g., from a memory system), decoding the instruction, obtaining needed operands, using the operands to perform an operation specified by the instruction, and saving a result. In a pipelined processor, the various steps of instruction execution are performed by independent units called pipeline stages. In the pipeline stages, corresponding steps of instruction execution are performed on different instructions independently, and intermediate results are passed to successive stages. By permitting the processor to overlap the executions of multiple instructions, pipelining allows the processor to execute more instructions per unit of time.

In practice, instructions are often interdependent, and these dependencies often result in "pipeline hazards." Pipeline hazards result in stalls that prevent instructions from continually entering a pipeline at a maximum possible rate. The resulting delays in pipeline flow are commonly called "bubbles." The detection and avoidance of hazards presents a formidable challenge to designers of pipeline processors, and hardware solutions can be considerably complex.

There are three general types of pipeline hazards: structural hazards, data hazards, and control hazards. A structural hazard occurs when instructions in a pipeline require the same hardware resource at the same time (e.g., access to a memory unit or a register file, use of a bus, etc.). In this situation, execution of one of the instructions must be delayed while the other instruction uses the resource.

A "data dependency" is said to exist between two instructions when one of the instructions requires a value produced by the other. A data hazard occurs in a pipeline when a first instruction in the pipeline requires a value produced by a second instruction in the pipeline, and the value is not yet available. In this situation, the pipeline is typically stalled until the operation specified by the second instruction is carried out and the result is produced.

In general, a "scalar" processor issues instructions for execution one at a time, and a "superscalar" processor is capable of issuing multiple instructions for execution at the same time. A pipelined scalar processor concurrently executes multiple instructions in different pipeline stages; the executions of the multiple instructions are overlapped as described above. A pipelined superscalar processor, on the other hand, concurrently executes multiple instructions in different pipeline stages, and is also capable of concurrently executing multiple instructions in the same pipeline stage. Pipeline hazards typically have greater negative impacts on performances of pipelined superscalar processors than on performances of pipelined scalar processors. Examples of pipelined superscalar processors include the popular Intel® Pentium® processors (Intel Corporation, Santa Clara, Calif.) and IBM® PowerPC® processors (IBM Corporation, White Plains, N.Y.).

Conditional branch/jump instructions are commonly used in software programs (i.e., code) to effectuate changes in control flow. A change in control flow is necessary to execute one or more instructions dependent on a condition. Typical conditional branch/jump instructions include "branch if equal," "jump if not equal," "branch if greater than," etc.

A "control dependency" is said to exist between a non-branch/jump instruction and one or more preceding branch/jump instructions that determine whether the non-branch/jump instruction is executed. A control hazard occurs in a pipeline when a next instruction to be executed is unknown, typically as a result of a conditional branch/jump instruction. When a conditional branch/jump instruction occurs, the correct one of multiple possible execution paths cannot be known with certainty until the condition is evaluated. Any incorrect prediction typically results in the need to purge partially processed instructions along an incorrect path from a pipeline, and refill the pipeline with instructions along the correct path.

A software technique called "predication" provides an alternate method for conditionally executing instructions. Predication may be advantageously used to eliminate branch instructions from code, effectively converting control dependencies to data dependencies. If the resulting data dependencies are less constraining than the control dependencies that would otherwise exist, instruction execution performance of a pipelined processor may be substantially improved.

In predicated execution, the results of one or more instructions are qualified dependent upon a value of a preceding predicate. The predicate typically has a value of "true" (e.g., binary "1") or "false" (e.g., binary "0"). If the qualifying predicate is true, the results of the one or more subsequent instructions are saved (i.e., used to update a state of the processor). On the other hand, if the qualifying predicate is false, the results of the one or more instructions are not saved (i.e., are discarded).

In some known processors, values of qualifying predicates are stored in dedicated predicate registers. In some of these processors, different predicate registers may be assigned (e.g., by a compiler) to instructions along each of multiple possible execution paths. Predicated execution may involve executing instructions along all possible execution paths of a conditional branch/jump instruction, and saving the results of only those instructions along the correct execution path. For example, assume a conditional branch/jump instruction has two possible execution paths. A first predicate register may be assigned to instructions along one of the two possible execution paths, and a second predicate register may be assigned to instructions along the second execution path. The processor attempts to execute instructions along both paths in parallel. When the processor determines the values of the predicate registers, results of instructions along the correct execution path are saved, and the results of instructions along the incorrect execution path are discarded.

The above method of predicated execution involves associating instructions with predicate registers (i.e., "tagging"

instructions along the possible execution paths with an associated predicate register). This tagging is typically performed by a compiler, and requires space (e.g., fields) in instruction formats to specify associated predicate registers. This presents a problem in reduced instruction set computer (RISC) processors typified by fixed-length and densely-packed instruction formats.

Another example of conditional execution involves the TMS320C6x processor family (Texas Instruments Inc., Dallas, Tex.). In the 'C6x processor family, all instructions are conditional. Multiple bits of a field in each instruction are allocated for specifying a condition. If no condition is specified, the instruction is executed. If an instruction specifies a condition, and the condition is true, the instruction is executed. On the other hand, if the specified condition is false, the instruction is not executed. This form of conditional execution also presents a problem in RISC processors in that multiple bits are allocated in fixed-length and densely-packed instruction formats.

SUMMARY OF THE INVENTION

A processor is disclosed including several features allowing the processor to simultaneously execute instructions of multiple conditional execution instruction groups. Each conditional execution instruction group includes a conditional execution instruction and a code block specified by the conditional execution instruction, wherein the code block includes one or more instructions. The conditional execution instruction specifies a condition, and a result of each of the instructions of the code block is saved dependent upon the existence of the specified condition in the processor during execution of the conditional execution instruction.

In one embodiment, the processor includes multiple state machines (e.g., finite state machines) simultaneously assignable to each of a corresponding number of conditional execution instruction groups (e.g., residing in a section of code retrieved by the processor from a memory system). Each state machine is configured to generate marking data for each of multiple instructions grouped together for simultaneous execution and including at least one instruction of the assigned conditional execution instruction group, and to store the marking data in a marking queue. The marking data for a given instruction may, for example, indicate whether the instruction is an instruction of a conditional execution instruction group.

In another embodiment, the processor includes multiple registers for storing the marking data pertaining to a number of instructions in each of multiple stages of an execution pipeline implemented within the processor.

In another embodiment, the processor includes multiple attribute queues simultaneously assignable to each of a corresponding number of conditional execution instruction groups. Each attribute queue is configured to store an attribute of each of multiple assigned conditional execution instruction groups, wherein the attribute includes a value indicative of a condition specified by a conditional execution instruction of the assigned conditional execution instruction group.

In another embodiment, the processor includes write enable logic and an execution unit. The write enable logic receives an attribute of each of multiple conditional execution instruction groups, wherein the attribute of each of the conditional execution instruction groups includes a value indicative of a condition specified by a conditional execution instruction of the conditional execution instruction group. The write enable logic produces multiple write enable signals dependent upon the received attributes. The execution unit receives the write enable signals and saves a result of one or more instructions of each of the conditional execution instruction groups dependent upon the write enable signals.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION OF THE PREFERRED EMBODIMENTS

In the following disclosure, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

Figure 1:
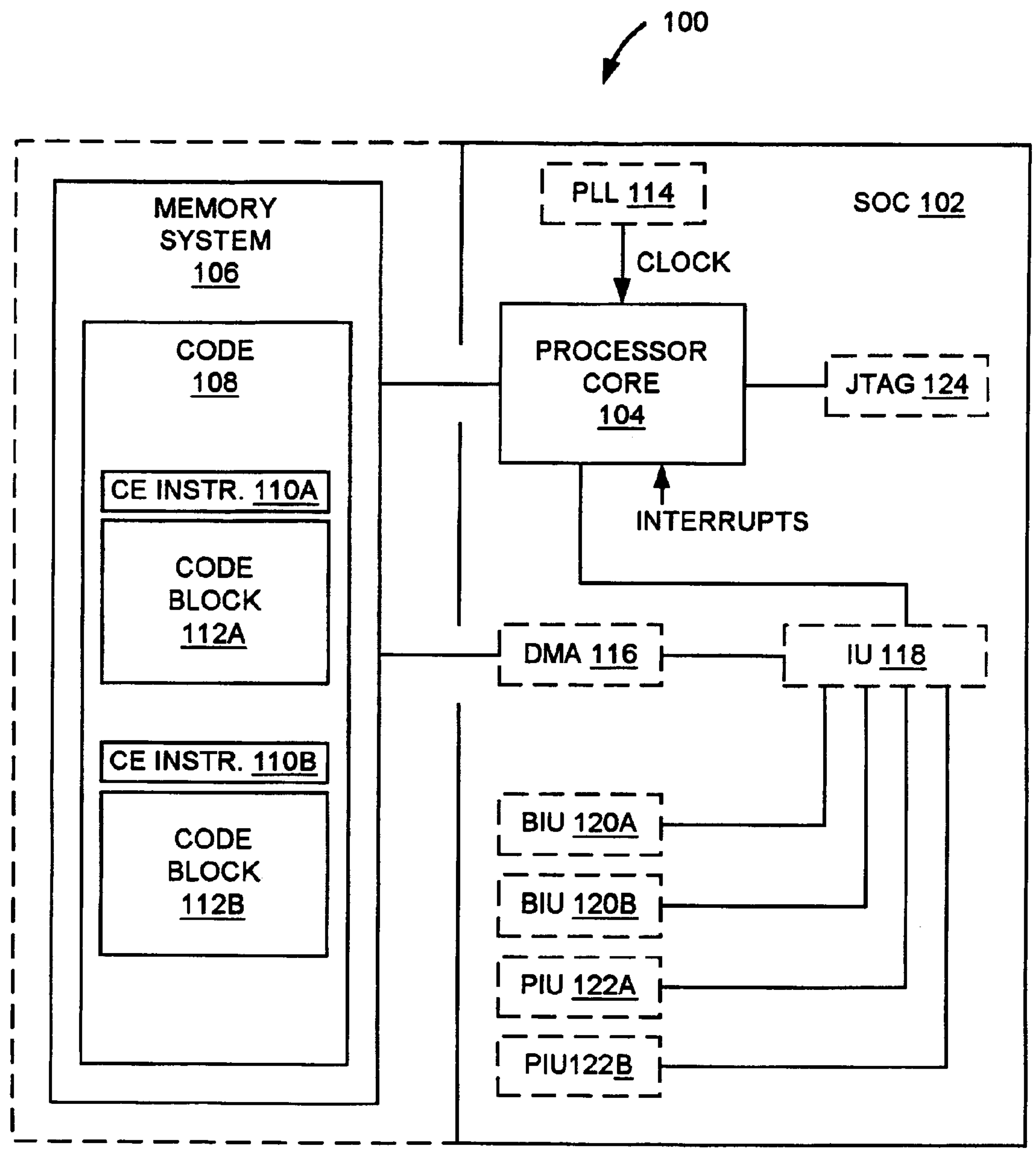
FIG. 1 is a diagram of one embodiment of a data processing system including a processor core of a system on a chip (SOC) coupled to a memory system, wherein the memory system includes software program instructions (i.e., "code"), and wherein the code includes multiple conditional execution instructions and multiple corresponding code blocks including one or more instructions to be conditionally executed.

FIG. 1 is a diagram of one embodiment of a data processing system 100 including a processor core 104 of a system on a chip (SOC) 102 coupled to a memory system 106. The processor core 104 executes instructions of a predefined instruction set. As indicated in FIG. 1, the processor core 104 receives a CLOCK signal and executes instructions dependent upon the CLOCK signal.

The processor core 104 is both a "processor" and a "core." The term "core" describes the fact that the processor core 104 is a functional block or unit of the SOC 102. It is now possible for integrated circuit designers to take highly complex functional units or blocks, such as processors, and integrate them into an integrated circuit much like other less complex building blocks. As indicated in FIG. 1, in addition to the processor core 104, the SOC 102 may include a phase-locked loop (PLL) circuit 114 that generates the CLOCK signal. The SOC 102 may also include a direct memory access (DMA) circuit 116 for accessing the memory system 106 substantially independent of the processor core 104. The SOC 102 may also include bus interface units (BIUs) 120A and 120B for coupling to external buses, and/or peripheral interface units (PIUs) 122A and 122B for coupling to external peripheral devices. An interface unit (IU) 118 may form an interface between the bus interfaces units (BIUs) 120A and 120B and/or the peripheral interface units (PIUs) 122A and 122B, the processor core 104, and the DMA circuit 116. The SOC 102 may also include a JTAG (Joint Test Action Group) circuit 124 including an IEEE Standard 1169.1 compatible boundary scan access port for circuit-level testing of the processor core 104. The processor core 104 may also receive and respond to external interrupt signals (i.e., interrupts) as indicated in FIG. 1.

In general the memory system 106 stores data, wherein the term "data" is understood to include instructions. In the embodiment of FIG. 1, the memory system 106 stores a software program (i.e., "code") 108 including instructions from the instruction set. The processor core 104 fetches instructions of the code 108 from the memory system 106, and executes the instructions.

In the embodiment of FIG. 1, the code 108 includes a conditional execution instruction 110A, a corresponding code block 112A specified by the conditional execution instruction 111A, a conditional execution instruction 110B, and a corresponding code block 112B specified by the conditional execution instruction 110B. Herein below, an indiscriminate one of the conditional execution instructions 111A and 111B will be referred to simply as "the conditional execution instructions 110," and the corresponding one of the code blocks 112A and 112B will be referred to as "the code block 112."

In general, the conditional execution instruction 110 is a conditional execution instruction of the instruction set, and the code block 112 includes one or more instructions selected from the instruction set. The conditional execution instruction 110 also specifies a condition that determines whether execution results of the one or more instructions of the code block 112 are saved in the processor core 104 and/or the memory system 106.

The processor core 104 fetches the conditional execution instruction 110 from the memory system 106 and executes the conditional execution instruction 110. The conditional execution instruction 110 specifies the code block 112 (e.g., a number of instructions making up the code block 112) and the condition. During execution of the conditional execution instruction 110, the processor core 104 determines the code block 112 and the condition, and evaluates the condition to determine if the condition exists in the processor core 104. The processor core 104 also fetches the instructions of the code block 112 from the memory system 106, and executes each of the instructions of the code block 112, producing corresponding execution results within the processor core 104. The execution results of the instructions of the code block 112 are saved in the processor core 104 and/or the memory system 106 dependent upon the existence of the condition specified by the conditional execution instruction 110 in the processor core 104. In other words, the condition specified by the conditional execution instruction 110 qualifies the writeback of the execution results of the instructions of the code block 112. The instructions of the code block 112 may otherwise traverse the pipeline normally. The results of the instructions of the code block 112 are used to change a state of the processor core 104 and/or the memory system 106 only if the condition specified by the conditional execution instruction 110 exists in the processor core 104.

In the embodiment of FIG. 1, the processor core 104 implements a load-store architecture. That is, the instruction set includes load instructions used to transfer data from the memory system 106 to registers of the processor core 104, and store instructions used to transfer data from the registers of the processor core 104 to the memory system 106. Instructions other than the load and store instructions specify register operands, and register-to-register operations. In this manner, the register-to-register operations are decoupled from accesses to the memory system 106.

The memory system 106 may include, for example, volatile memory structures (e.g., dynamic random access memory structures, static random access memory structures, etc.) and/or non-volatile memory structures (read only memory structures, electrically erasable programmable read only memory structures, flash memory structures, etc.).

Figure 2:
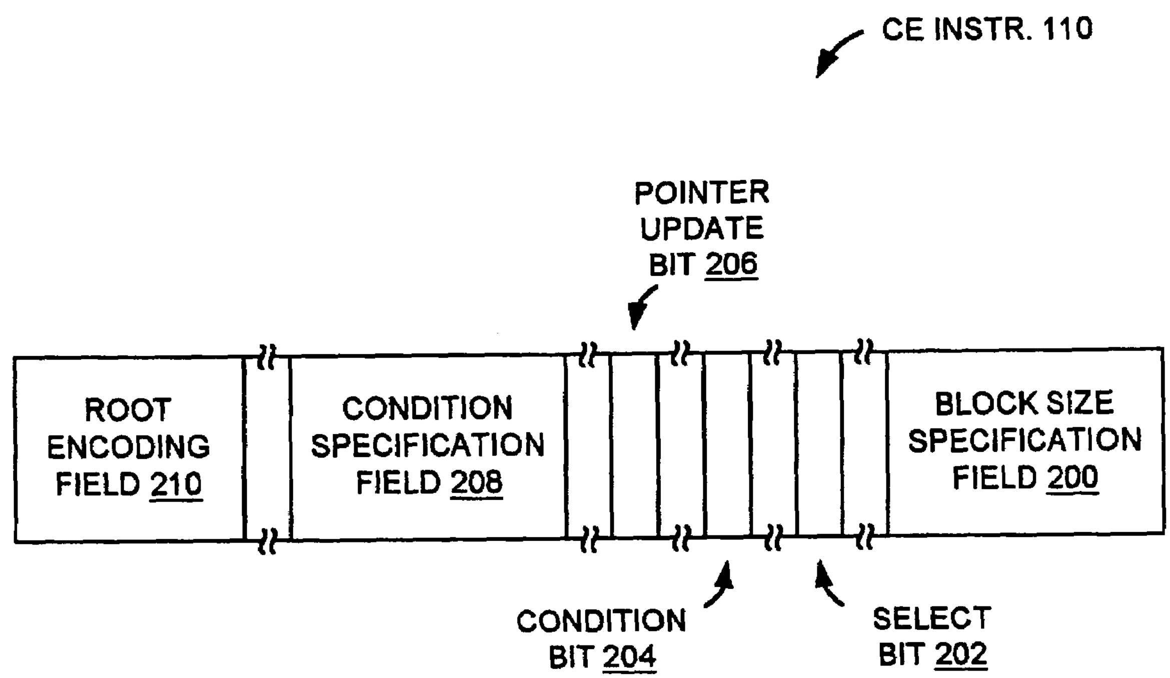
FIG. 2 depicts one embodiment of the conditional execution instruction of FIG. 1.

FIG. 2 depicts one embodiment of the conditional execution instruction 110 of FIG. 1. In the embodiment of FIG. 2, the conditional execution instruction 110 and the one or more instructions of the code block 112 of FIG. 1 are fixed-length instructions (e.g., 16-bit instructions), and the instructions of the code block 112 immediately follow the conditional execution instruction 110 in the code 108 of FIG. 1. It is noted that other embodiments of the conditional execution instruction 110 of FIG. 1 are possible and contemplated.

In the embodiment of FIG. 2, the conditional execution instruction 110 includes a block size specification field 200, a select bit 202, a condition bit 204, a pointer update bit 206, a condition specification field 208, and a root encoding field 210. The block size specification field 200 is used to store a value indicating a number of instructions immediately following the conditional execution instruction 110 and making up the code block 112 of FIG. 1. The block size specification field 200 may be, for example, a 3-bit field specifying a code block including from 1 (block size specification field="000") to 8 (block size specification field "111") instructions immediately following the conditional execution instruction 110.

As described in detail below, the processor core 104 of FIG. 1 includes multiple flag registers and multiple general purpose registers. A value of the select bit 202 indicates whether the condition specified by the conditional execution instruction 110 of FIG. 1 is stored in a flag register or in a general purpose register. For example, if the select bit 202 is a '0,' the select bit 202 may indicate that the condition specified by the conditional execution instruction 110 of FIG. 1 is stored in a flag register. On the other hand, if the select bit 202 is a '1,' the select bit 202 may indicate that the condition specified by the conditional execution instruction 110 of FIG. 1 is stored in a general purpose register.

In general, the condition bit 204 specifies a value used to qualify the execution results of the instructions in the code block 112. For example, if the condition bit 204 is a '0,' the execution results of the instructions of the code block 112 of FIG. 1 may be qualified (i.e., stored) only if a value stored in a specified register of the processor core 104 of FIG. 1 is equal to '0' during execution of the conditional execution instruction 110. On the other hand, if the condition bit 204 is a '1,' the execution results of the instructions of the code block 112 may be stored only if the value stored in the specified register is equal to '1.'

For example, when the select bit 202 indicates that the condition specified by the conditional execution instruction 110 of FIG. 1 is stored in a flag register and the condition bit 204 is a '0,' the condition specified by the conditional execution instruction 110 may be that the value of a specified flag bit in a specified flag register is '0.' Similarly, when the select bit 202 indicates that the condition specified by the conditional execution instruction 110 of FIG. 1 is stored in a general purpose register and the condition bit 204 is a '0,' the condition specified by the conditional execution instruction 110 may be that the value stored in the specified general purpose register is '0.'

In a similar manner, when the select bit 202 indicates that the condition specified by the conditional execution instruction 110 of FIG. 1 is stored in a flag register and the condition bit 204 is a '1,' the condition specified by the conditional execution instruction 110 may be that the value of the specified flag bit in the specified flag register is '1.' Similarly, when the select bit 202 indicates that the condition specified by the conditional execution instruction 110 of FIG. 1 is stored in a general purpose register and the condition bit 204 is a '1,' the condition specified by the conditional execution instruction 110 may be that the value stored in the specified general purpose register is '1.'

The processor core 104 of FIG. 1 is configured to execute load/store with update instructions described above. In some load/store with update instructions, the contents of a general purpose register of the processor core 104 is used as an address (i.e., a pointer) to access a memory location in the memory system 106 of FIG. 1. A value (e.g., an index value) is then added to the contents of the general purpose register (i.e., the pointer is updated) such that the contents of the general purpose register is an address of a next sequential value in the memory system 106.

For example, a set of instructions executable by the processor core 104 of FIG. 1 may include a load with update instruction 'ldu' having the following syntax: ldu rX, rY, n. In a first operation specified by the 'ldu' instruction, the contents of a first general purpose register 'rY' of the processor core 104 is used as an address (i.e., a pointer) to access a memory location in the memory system 106 of FIG. 1, and a value stored in the memory location is saved in a second general purpose register 'rX' of the processor core 104. In a second operation specified by the 'ldu' instruction, the integer value 'n' is added to the contents of the register 'rY', and the result is stored in the register 'rY' such that the contents of the register 'rY' is an address of a next sequential value in the memory system 106 (i.e., the pointer is updated).

Other load/store with update instructions exist in the set of instructions executable by the processor core 104 of FIG. 1. In general, the load/store with update instructions are distinguished from other load/store instructions in that in addition to loading a value from a memory location into a general purpose register of the processor core 104, or storing a value in a general purpose register to a memory location, the load/store with update instructions also modify an address (i.e., update a pointer) stored in a separate general purpose register of the processor core 104.

In general, the pointer update bit 206 indicates whether general purpose registers of the processor core 104 used to store memory addresses (i.e., pointers) are to be updated in the event the code block 112 of FIG. 1 includes one or more load/store instructions. For example, when the update bit 206 has a value of '0', the pointer update bit 206 may specify that any pointers in any load/store instructions of the code block 112 are to be updated only if the condition specified by the conditional execution instruction 110 of FIG. 1 is true. In this situation, when the pointer update bit 206 has a value of '0' and the condition specified by the conditional execution instruction 110 is false, the pointers in any load/store instructions of the code block 112 are not updated.

When the pointer update bit 206 has a value of '1', the pointer update bit 206 may specify that any pointers in any load/store instructions of the code block 112 of FIG. 1 are to be updated unconditionally (e.g., independent of the condition specified by the conditional execution instruction 110 of FIG. 1). In this situation, if the pointer update bit 206 has a value of '1', the pointers in any load/store instructions of the code block 112 are updated regardless of whether the condition specified by the conditional execution instruction 110 of FIG. 1 is true or false.

In general, the condition specification field 208 specifies either a particular flag bit in a particular flag register, or a particular one of the multiple general purpose registers of the processor core 104. For example, when the select bit 202 indicates that the condition specified by the conditional execution instruction 110 of FIG. 1 is stored in a flag register, the condition specification field 208 specifies a particular one of the multiple flag registers of the processor core 104 of FIG. 1, and a particular one of several flag bits in the specified flag register. When the select bit 202 indicates that the condition specified by the conditional execution instruction 110 of FIG. 1 is stored in a general purpose register, the condition specification field 208 specifies a particular one of the multiple general purpose registers of the processor core 104 of FIG. 1.

As described in more detail below, the processor core 104 of FIG. 1 includes two flag registers: a hardware flag register 'HWFLAG' and a static hardware flag register 'SHWFLAG.' Both the HWFLAG and the SHWFLAG registers store the following flag bits:

v=32-Bit Overflow Flag. Cleared (i.e., '0') when a sign of a result of a twos-complement addition is the same as signs of 32-bit operands (where both operands have the same sign); set (i.e., '1') when the sign of the result differs from the signs of the 32-bit operands.

gv=Guard Register 40-Bit Overflow Flag. (Same as the 'v' flag bit described above, but for 40-bit operands.)

sv=Sticky Overflow Flag. (Same as the 'v' flag bit described above, but once set, can only be cleared through software by writing a '0' to the 'sv' bit.)

gsv=Guard Register Sticky Overflow Flag. (Same as the 'gv' flag bit described above, but once set, can only be cleared through software by writing a '0' to the 'gsv' bit.)

c=Carry Flag. Set when a carry occurs during a twos-complement addition for 16-bit operands; cleared when no carry occurs.

ge=Greater Than Or Equal To Flag. Set when a result is greater than or equal to zero; cleared when the result is not greater than or equal to zero.

gt=Greater Than Flag. Set when a result is greater than zero; cleared when the result is not greater than zero.

z=Equal to Zero Flag. Set when a result is equal to zero; cleared when the result is not equal to zero.

Table 1 below lists exemplary encodings of the condition specification field 208 valid when the select bit 202 indicates that the condition specified by the conditional execution instruction 110 of FIG. 1 is stored in a flag register:

TABLE 1

Exemplary Encodings of the Condition specification field 208 Valid When the Select Bit 202 Indicates the Condition Is Stored in a Flag Register.

| Cond. Spec. Field 206 Value | Specified Flag Register | Specified Flag Bit |
|---|---|---|
| 0000 | HWFLAG | v |
| 0001 | HWFLAG | gv |
| 0010 | HWFLAG | sv |
| 0011 | HWFLAG | gsv |
| 0100 | HWFLAG | c |
| 0101 | HWFLAG | ge |
| 0118 | HWFLAG | gt |
| 0111 | HWFLAG | z |
| 1000 | SHWFLAG | v |
| 1001 | SHWFLAG | gv |
| 1010 | SHWFLAG | sv |
| 1011 | SHWFLAG | gsv |
| 1180 | SHWFLAG | c |
| 1181 | SHWFLAG | ge |
| 1118 | SHWFLAG | gt |
| 1111 | SHWFLAG | z |

For example, referring to Table 1 above, when the select bit 202 indicates that the condition specified by the conditional execution instruction 110 of FIG. 1 is stored in a flag register, a '0101' encoding of the condition specification field 208 of the conditional execution instruction 110 specifies the hardware flag register and the 'ge' flag bit of the hardware flag register. If the condition bit 204 indicates the specified value must be a '1,' and the 'ge' flag bit of the hardware flag register is '1' during execution of the conditional execution instruction 110, the execution results of the instructions of the block 112 of FIG. 1 are saved. On the other hand, if the 'ge' flag bit of the hardware flag register is '0' during execution of the conditional execution instruction 110, the execution results of the instructions of the code block 112 of FIG. 1 are not saved (i.e., the execution results are discarded).

As described in more detail below, the processor core 104 of FIG. 1 also includes 16 general purpose registers (GPRs) numbered '0' through '15.' Table 2 below lists exemplary on field 208 valid when the select bit 202 indicates that the condition specified by the conditional execution instruction 110 of FIG. 1 is stored in a general purpose register:

TABLE 2

Exemplary Encodings of the Condition specification field 208 Valid When the Select Bit 202 Indicates the Condition Is Stored in a General Purpose Register.

| Cond. Spec. Field 206 Value | Specified GPR |
|---|---|
| 0000 | GPR 0 |
| 0001 | GPR 1 |
| 0010 | GPR 2 |
| 0011 | GPR 3 |
| 0100 | GPR 4 |
| 0101 | GPR 5 |
| 0118 | GPR 6 |
| 0111 | GPR 7 |
| 1000 | GPR 8 |
| 1001 | GPR 9 |
| 1010 | GPR 10 |
| 1011 | GPR 11 |
| 1180 | GPR 12 |
| 1181 | GPR 13 |
| 1118 | GPR 14 |
| 1111 | GPR 15 |

For example, referring to Table 2 above, when the select bit 202 indicates that the condition specified by the conditional execution instruction 110 of FIG. 1 is stored in a general purpose register a '1011' encoding of the condition specification field 208 of the conditional execution instruction 110 specifies the GPR 11 register of the processor core 104 of FIG. 1. If the condition bit 204 indicates the specified value must be a '1,' and the GPR 11 register contains a '1' during execution of the conditional execution instruction 110, the execution results of the instructions of the code block 112 of FIG. 1 are saved. On the other hand, if the GPR 11 register contains a '0' during execution of the conditional execution instruction 110, the execution results of the instructions of the code block 112 of FIG. 1 are not saved (i.e., the execution results are discarded).

The root encoding field 210 identifies an operation code (opcode) of the conditional execution instruction 110 of FIG. 2. In other embodiments of the conditional execution instruction 110, the root encoding field 210 may also help define the condition specified by the conditional execution instruction 110. For example, the root encoding field 210 may also specify a particular group of registers within the processor core 104 of FIG. 1 and/or a particular register within the processor core 104.

Figure 3:
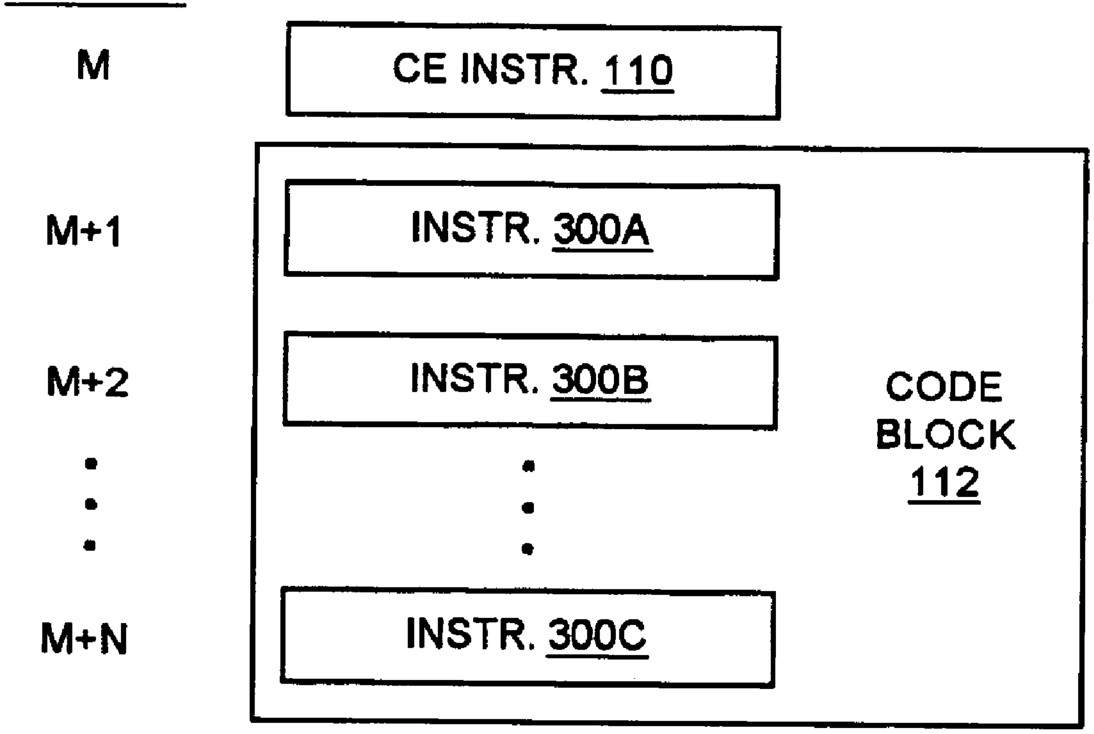
FIG. 3 is a diagram depicting an arrangement of one of the multiple conditional execution instructions of FIG. 1 and instructions of the corresponding code block of FIG. 1 in the code of FIG. 1.

FIG. 3 is a diagram depicting an arrangement of the conditional execution instruction 110 of FIG. 1 and instructions of the code block 112 of FIG. 1 in the code 108 of FIG. 1. In the embodiment of FIG. 3, the code block 112 includes n instructions. The conditional execution instruction 110 is instruction number m in the code 108, and the n instructions of the code block 112 includes instructions 300A, 300B, and 300C. The instruction 300A immediately follows the conditional execution instruction 110 in the code 108, and is instruction number m+1 of the code 108. The instruction 300B immediately follows the instruction 300A in the code 108, and is instruction number m+2 of the code 108. The instruction 300C is instruction number m+n of the code 108, and is the nth (i.e., last) instruction of the code block 112.

Figure 4:
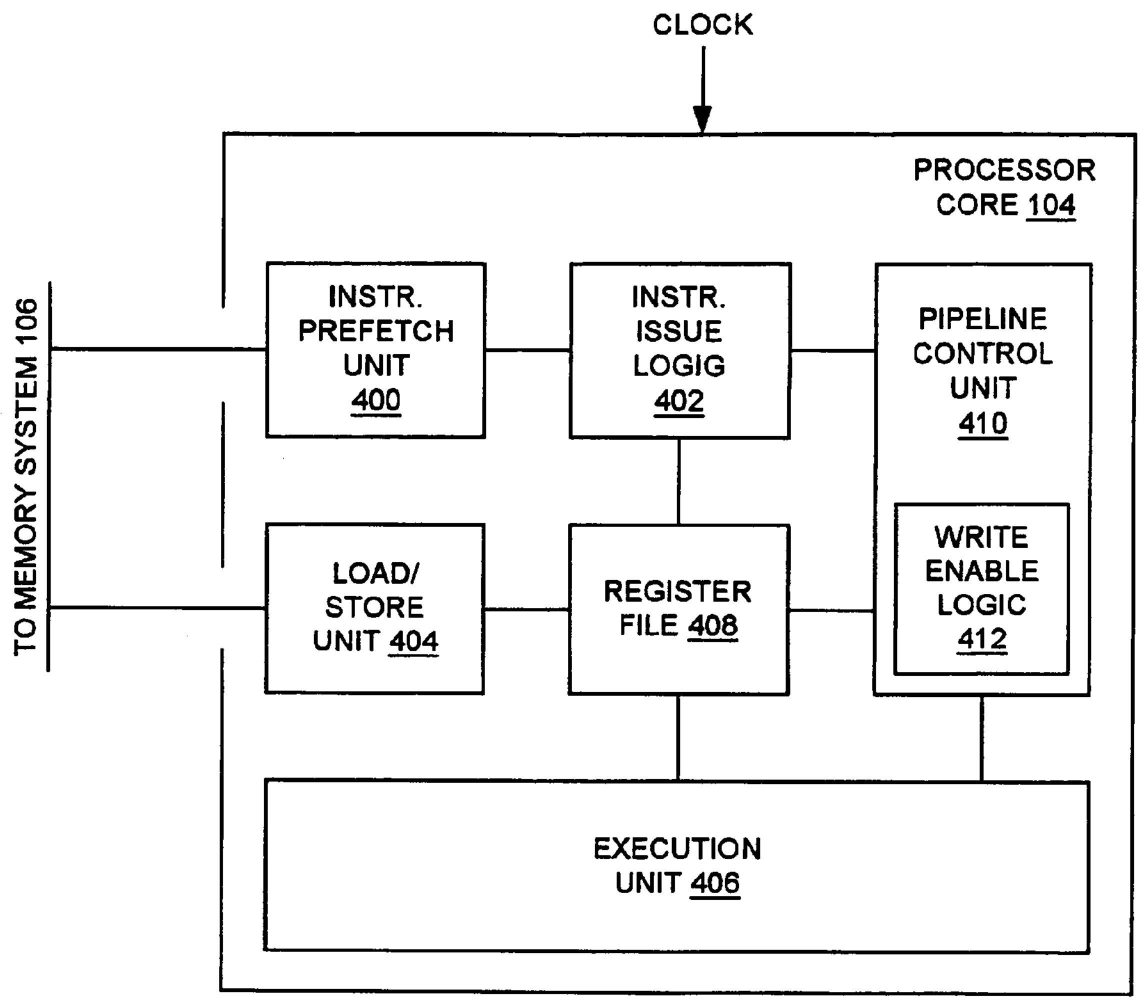
FIG. 4 is a diagram of one embodiment of the processor core of FIG. 1, wherein the processor core includes instruction issue logic and write enable logic.

FIG. 4 is a diagram of one embodiment of the processor core 104 of FIG. 1. In the embodiment of FIG. 4, the processor core 104 includes an instruction prefetch unit 400, instruction issue logic 402, a load/store unit 404, an execution unit 406, a register file 408, and a pipeline control unit 410. In the embodiment of FIG. 4, the processor core 104 is a pipelined superscalar processor core. That is, the processor core 104 implements an instruction execution pipeline including multiple pipeline stages, concurrently executes multiple instructions in different pipeline stages, and is also capable of concurrently executing multiple instructions in the same pipeline stage.

In general, the instruction prefetch unit 400 fetches instructions from the memory system 106 of FIG. 1, and provides the fetched instructions to the instruction issue logic 402. In one embodiment, the instruction prefetch unit 400 is capable of fetching up to 8 instructions at a time from the memory system 106, partially decodes the instructions, and stores the partially decoded instructions in an instruction cache within the instruction prefetch unit 400.

The instruction issue logic 402 decodes the instructions and translates the opcode to a native opcode, then stores the decoded instructions in the instruction queue 506 (as described below). The load/store unit 404 is used to transfer data between the processor core 104 and the memory system 106 as described above. The execution unit 406 is used to perform operations specified by instructions (and corresponding decoded instructions). In one embodiment, the execution unit 406 of FIG. 4 includes an arithmetic logic unit (ALU), a multiply-accumulate unit (MAU), and a data forwarding unit (DFU). The register file 408 includes multiple registers of the processor core 104, and is described in more detail below. In general, the pipeline control unit 410 controls the instruction execution pipeline described in more detail below.

In one embodiment, the instruction issue logic 402 is capable of receiving (or retrieving) n partially decoded instructions (n>1) from the instruction cache within the instruction prefetch unit 400 of FIG. 4, and decoding the n partially decoded instructions, during a single cycle of the CLOCK signal. The instruction issue logic 402 then issues the n instructions as appropriate.

In one embodiment, the instruction issue logic 402 decodes instructions and determines what resources within the execution unit 406 are required to execute the instructions (e.g., an arithmetic logic unit or ALU, a multiply-accumulate unit or MAU, etc.). The instruction issue logic 402 also determines an extent to which the instructions depend upon one another, and queues the instructions for execution by the appropriate resources of the execution unit 406.

As described above, the register file 408 of FIG. 4 includes a hardware flag register and a static hardware flag register. Both the a hardware flag register and the static hardware flag register include the flag bits 'v', 'gv', 'sv', 'gsv', 'c', 'ge', 'gt', and 'z' described above. The hardware flag register 504 is updated during instruction execution such that the flag bits in the hardware flag register 504 reflect a state or condition of the processor core 104 of FIGS. 1 and 4 resulting from instruction execution. The static hardware flag register, on the other hand, is updated only when a conditional execution instruction in the code 108 of FIG. 1 (e.g., the conditional execution instruction 110 of FIGS. 1 and 3) specifies the hardware flag register.

Figure 5:
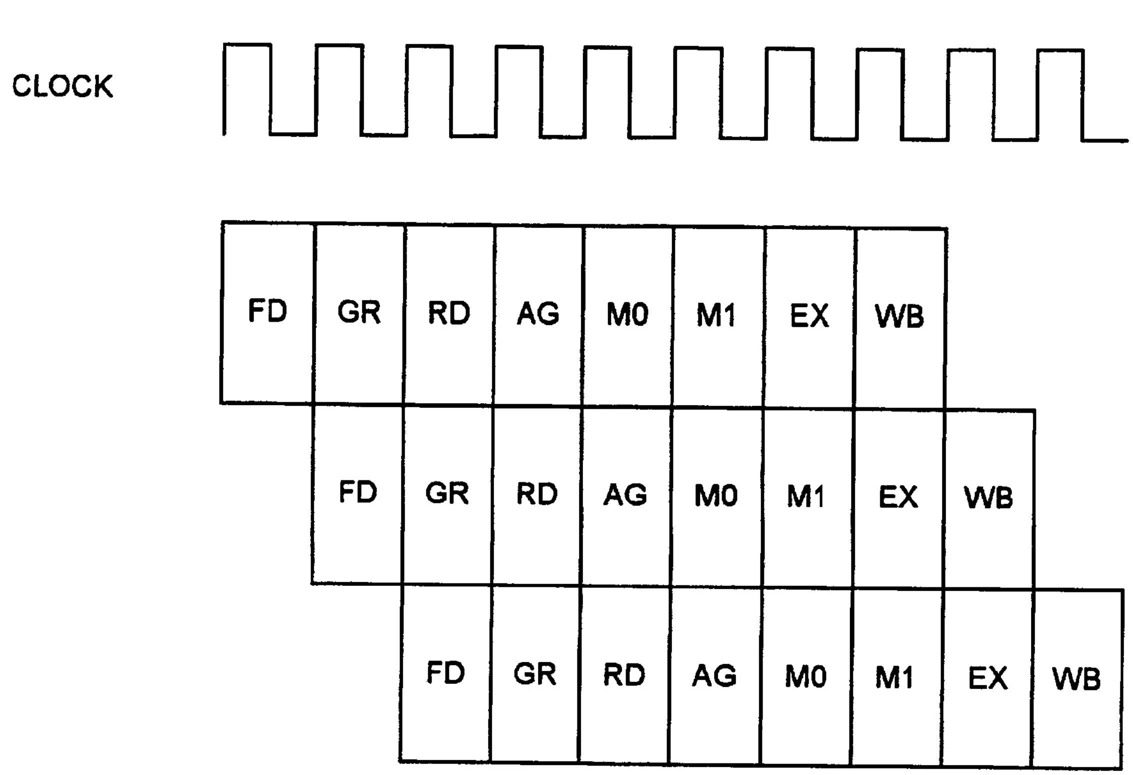
FIG. 5 is a diagram illustrating an instruction execution pipeline implemented within the processor core of FIG. 4.

FIG. 5 is a diagram illustrating the instruction execution pipeline implemented within the processor core 104 of FIG. 4. The instruction execution pipeline (pipeline) allows overlapped execution of multiple instructions. In the example of FIG. 5, the pipeline includes 8 stages: a fetch/decode (FD) stage, a grouping (GR) stage, an operand read (RD) stage, an address generation (AG) stage, a memory access 0 (M0) stage, a memory access 1 (M1) stage, an execution (EX) stage, and a write back (WB) stage. As indicated in FIG. 5, operations in each of the 8 pipeline stages are completed during a single cycle of the CLOCK signal.

Referring to FIGS. 4 and 5, the instruction fetch unit 400 fetches several instructions (e.g., up to 8 instructions) from the memory system 106 of FIG. 1 during the fetch/decode (FD) pipeline stage, partially decodes and aligns the instructions, and provides the partially decoded instructions to the instruction issue logic 402. The instruction issue logic 402 fully decodes the instructions and stores the fully decoded instructions in an instruction queue (described more fully later). The instruction issue logic 402 also translates the opcodes into the native opcodes for the processor.

During the grouping (GR) stage, the instruction issue logic 402 checks the multiple decoded instructions for grouping and dependency rules, and passes one or more of the decoded instructions conforming to the grouping and dependency rules on to the read operand (RD) stage as a group. During the read operand (RD) stage, any operand values, and/or values needed for operand address generation, for the group of decoded instructions are obtained from the register file 408.

During the address generation (AG) stage, any values needed for operand address generation are provided to the load/store unit 404, and the load/store unit 404 generates internal addresses of any operands located in the memory system 106 of FIG. 1. During the memory address 0 (M0) stage, the load/store unit 404 translates the internal addresses to external memory addresses used within the memory system 106 of FIG. 1.

During the memory address 1 (M1) stage, the load/store unit 404 uses the external memory addresses to obtain any operands located in the memory system 106 of FIG. 1. During the execution (EX) stage, the execution unit 406 uses the operands to perform operations specified by the one or more instructions of the group. During a final portion of the execution (EX) stage, valid results (including qualified results) are stored in registers of the register file 408.

During the write back (WB) stage, valid results (including qualified results) of store instructions, used to store data in the memory system 106 of FIG. 1 as described above, are provided to the load/store unit 404. Such store instructions are typically used to copy values stored in registers of the register file 408 to memory locations of the memory system 106.

Figure 6:
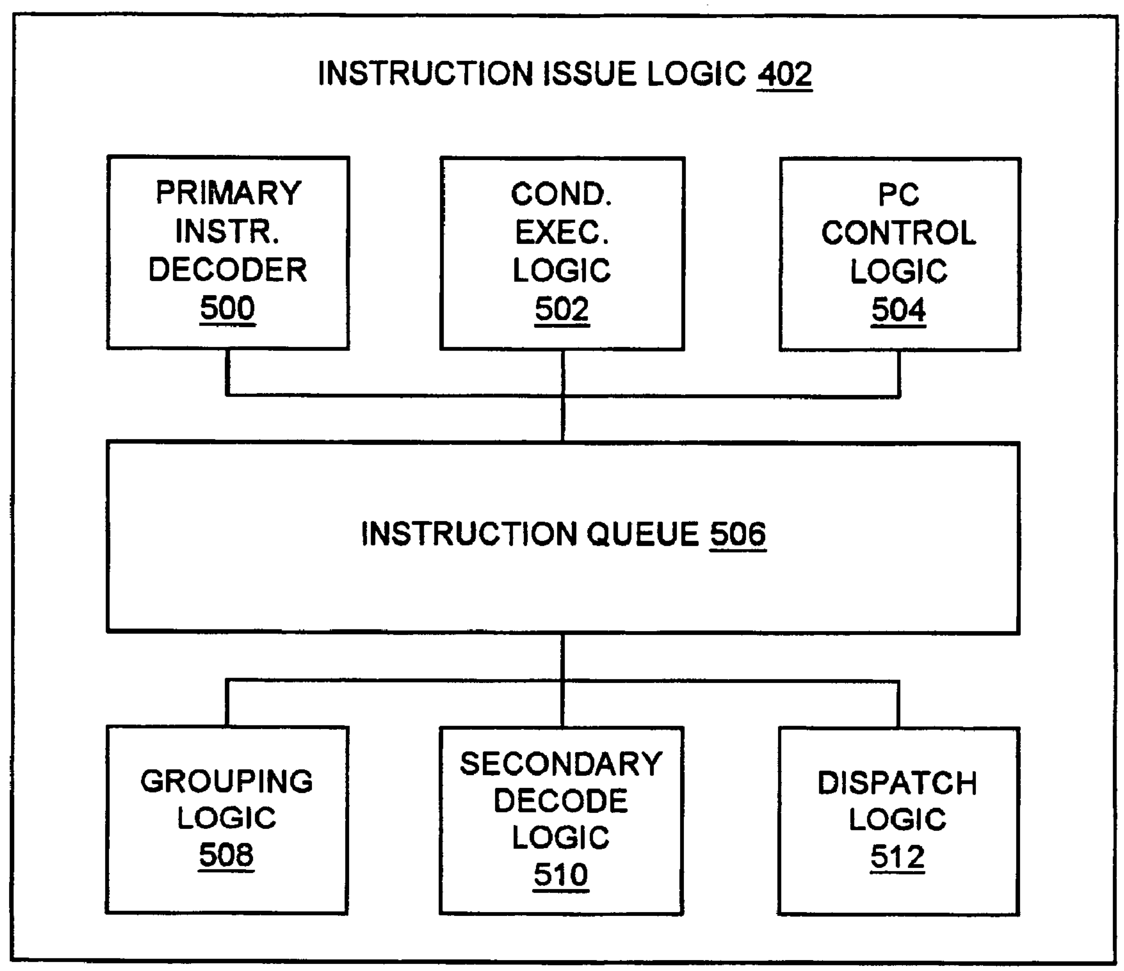
FIG. 6 is a diagram of one embodiment of the instruction issue logic of FIG. 4, wherein the instruction issue logic includes conditional execution logic FIGS. 7A and 7B in combination form a diagram of one embodiment of a mechanism for executing instructions of two different conditional execution (CE) instruction groups at the same time, wherein a majority of the logic forming the mechanism resides in the conditional execution logic of FIG. 6, and wherein the mechanism includes a first finite state machine and a second finite state machine shown in FIG. 7A.

FIG. 6 is a diagram of one embodiment of the instruction issue logic 402 of FIG. 4. In the embodiment of FIG. 6, the instruction issue logic 402 includes a primary instruction decoder 500, conditional execution logic 502, program counter (PC) control logic 504, an instruction queue 506, grouping logic 508, secondary decode logic 510, and dispatch logic 512.

In one embodiment, the primary instruction decoder 500 includes an n-slot queue (n>1) for storing partially decoded instruction received (or retrieved) from the instruction prefetch unit 400 of FIG. 4 (e.g., from an instruction queue of the instruction prefetch unit 400). Each of the n slots has dedicated decode logic associated with it. Up to n instructions occupying the n slots are fully decoded during the fetch/decode (FD) stage of the pipeline and stored in the instruction queue 508.

In the grouping (GR) stage of the pipeline, the instruction queue 506 provides fully decoded instructions (e.g., from the n-slot queue) to the grouping logic 508. The grouping logic 508 performs dependency checks on the fully decoded instructions by applying a predefined set of dependency rules (e.g., write-after-write, read-after-write, write-after-read, etc.). The set of dependency rules determine which instructions can be grouped together for simultaneous execution (e.g., execution in the same cycle of the CLOCK signal).

The conditional execution logic 502 identifies conditional execution instructions (e.g., the conditional execution instruction 110 of FIG. 1) and tags instructions of the code blocks specified by the conditional execution instructions. For example, referring back to FIG. 3, the conditional execution logic 502 would tag the instructions 300A and 300C of the code block 112 specified by the conditional execution instruction 110. When instructions in code blocks specified by conditional execution instructions enter the grouping (GR) pipeline stage, they are identified (i.e., tagged) to ensure that the grouping logic 508 groups them for conditional execution.

In general, the program counter (PC) control logic 504 stores several program counter (PC) values used to track instruction execution activities within the processor core 104 of FIGS. 1 and 4. In one embodiment, the program counter (PC) control logic 504 includes a program counter (PC) register, a trap PC (TPC) register used to store a return address when an interrupt is asserted, and a return PC (RPC) register used to store a return address when a CALL software program instruction occurs in the code 108 of FIG. 1. In one embodiment, the PC, TPC, and RPC registers have corresponding queues: a PC queue, a TPC queue, and an RPC queue, and the PC control logic 504 includes logic to update the PC, TPC, and RPC registers and the corresponding queues. In one embodiment, the PC control logic 504 also includes a branch mispredict PC register, a corresponding mispredict queue, and logic to keep track of branch mispredictions.

The instruction queue 506 is used to store fully decoded instructions (i.e., "instructions") which are queued for grouping and dispatch to the pipeline. In one embodiment, the instruction queue 506 includes n slots and instruction ordering multiplexers. The number of instructions stored in the instruction queue 506 varies over time dependent upon the ability to group instructions. As instructions are grouped and dispatched from the instruction queue 506, newly decoded instructions received from the primary instruction decoder 500 may be stored in empty slots of the instruction queue 506.

The secondary decode logic 510 includes additional instruction decode logic used in the grouping (GR) stage, the operand read (RD) stage, the memory access 0 (M0) stage, and the memory access 1 (M1) stage of the pipeline. In general, the additional instruction decode logic provides additional information from the opcode of each instruction to the grouping logic 510. For example, the secondary decode logic 510 may be configured to find or decode a specific instruction or group of instructions to which a grouping rule can be applied.

In one embodiment, the dispatch logic 512 queues relevant information such as native opcodes, read control signals, or register addresses for use by the execution unit 406, register file 408, and load/store unit 404 at the appropriate pipeline stage.

Herein below, the term "CE instruction group" will be used to describe a group of instructions including a conditional execution instruction and the instructions of the code block specified by the conditional execution instruction. For example, the conditional execution instruction 110A of FIG. 1 and the instructions of the corresponding code block 112A of FIG. 1 form one CE instruction group, and the conditional execution instruction 110B of FIG. 1 and the instructions of the corresponding code block 112B of FIG. 1 form another CE instruction group.

Figure 7A:
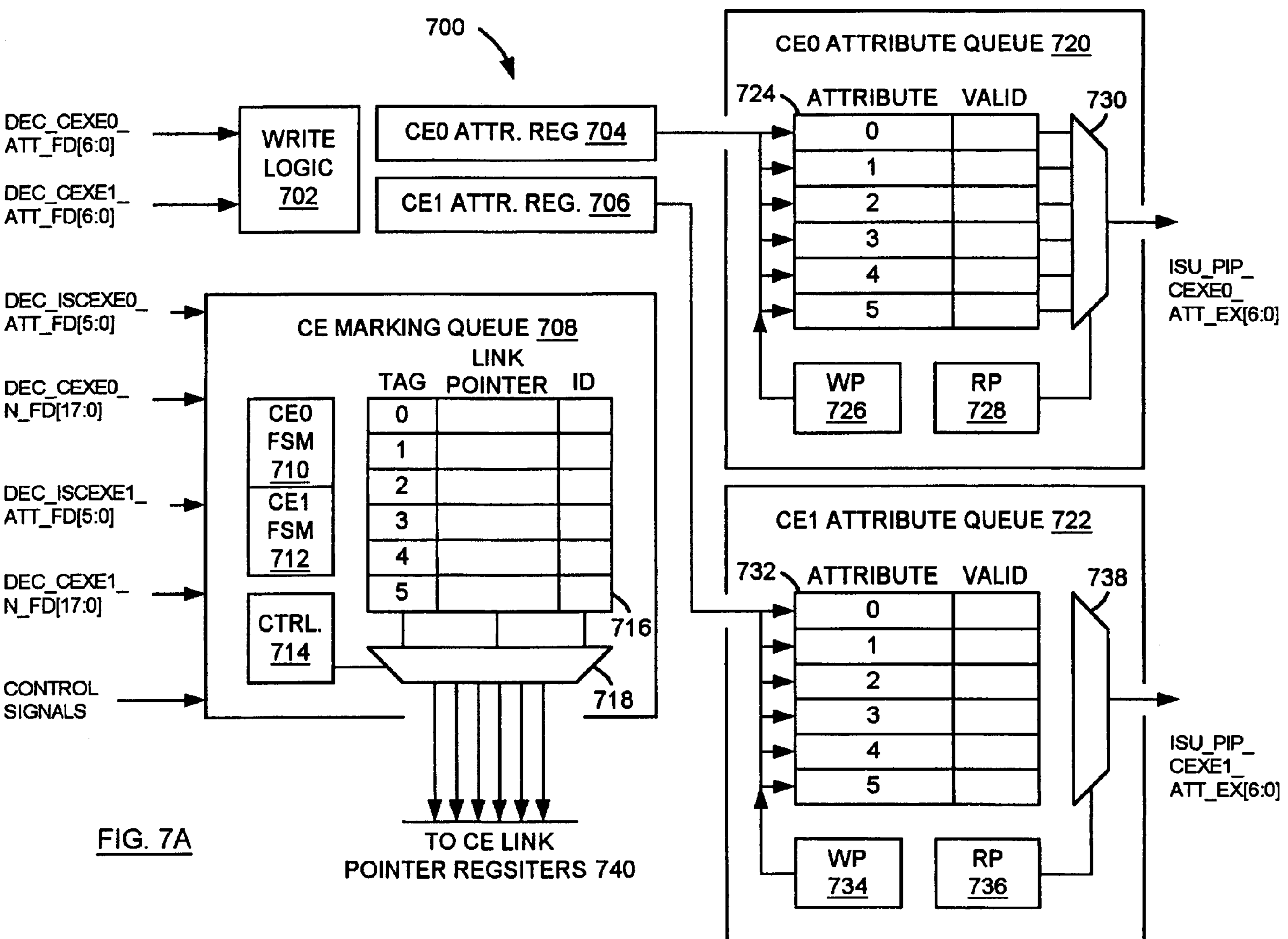
Figure 7B:
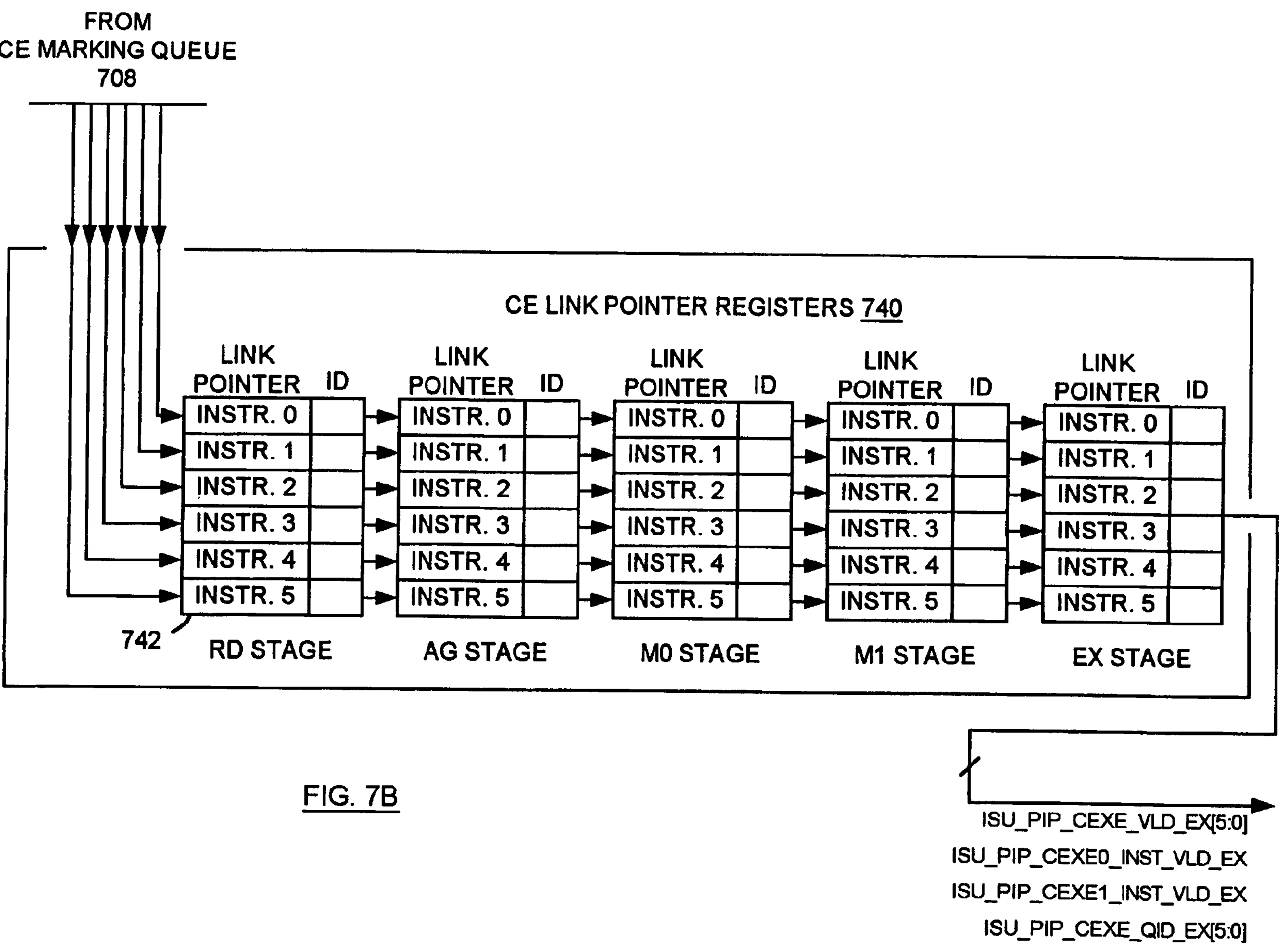

FIGS. 7A and 7B in combination form a diagram of one embodiment of a mechanism 700 for executing instructions of two different CE instruction groups at the same time. For example, the mechanism 700 allows the processor core 104 of FIGS. 1 and 4 to simultaneously execute instructions of a first CE instruction group including conditional execution instruction 110A of FIG. 1 and the instructions of the corresponding code block 112A, and instructions of a second CE instruction group including the conditional execution instruction 110B of FIG. 1 and the instructions of the corresponding code block 112B of FIG. 1. While a majority of the logic forming the mechanism 700 resides in the conditional execution logic 502 of FIG. 6, a portion of the logic forming the mechanism 700 is associated with the grouping (GR) pipeline stage and resides outside of the conditional execution logic 502.

Table 3 below lists input and output signals of the embodiment of the mechanism 700 of FIGS. 7A-7B. In Table 3, the term "cexe" is an abbreviation for "conditional execution," the term "cexe block0" refers to a first CE instruction group, the term "cexe block1" refers to a second CE instruction group, and a value indicative of a condition specified by a conditional execution instruction is termed an "attribute":

TABLE 3

Input and Output Signals of the mechanism 700 of FIGS. 7A-7B.

| Signal Name | Description |
|---|---|
| dec_cexe0_att_fd[6:0] | Attribute for cexe block0. |
| dec_iscexe0_fd[5:0] | This bus indicates a first cexe instruction exists in one of the six instruction slots. |
| dec_cexe0_n_fd[17:0] | The size of the cexe block0:<br>bits [2:0] - correspond to a cexe in instruction slot0<br>bits [5:3] - correspond to a cexe in instruction slot1<br>bits [8:6] - correspond to a cexe in instruction slot2<br>bits [11:9] - correspond to a cexe in instruction slot3<br>bits [14:12] - correspond to a cexe in instruction slot4<br>bits [17:15] - correspond to a cexe in instruction slot5 |
| isu_pip_cexe0_att_ex[6:0] | Attribute corresponds to a cexe block0 in EX pipeline stage. |
| dec_cexe1_att_fd[6:0] | Attribute for cexe block1 from the instruction decoder. |
| dec_iscexe1_fd[5:0] | This bus indicates a second cexe instruction exists in one of the four instruction slot. Only bits [5:2] are used; bits [1:0] are always zero. |
| dec_cexe1_n_fd[17:0] | The size of the cexe block1:<br>bits [2:0] - Not used<br>bits [5:3] - Not used |

TABLE 3-continued

Input and Output Signals of the mechanism 700 of FIGS. 7A-7B.

| Signal Name | Description |
|---|---|
| | bits [8:6] - correspond to a cexe in instruction slot2 bits [11:9] - correspond to a cexe in instruction slot3 bits [14:12] - correspond to a cexe in instruction slot4 bits [17:15] - correspond to a cexe in instruction slot5. |
| isu_pip_cexe1_att_ex[6:0] | Attribute corresponds to a cexe block1 in EX pipeline stage. |
| control signals | Control signals to update the tag based on the number of instructions that are grouped in GR stage and the number of new instructions that have arrived in FD stage. |
| isu_pip_cexe_vld_ex[5:0] | This bus indicates there is one or more valid cexe instructions in EX pipeline stage. The pipeline control unit uses this information to determine whether a write enable logic associated with an instruction slot should be qualified with the cexe write enable logic. |
| isu_pip_cexe_qid_ex[5:0] | This bus indicates which CE attribute queue a current cexe instruction in EX pipeline stage is using. The pipeline control unit uses this information to select appropriate cexe write enable logic. |
| isu_pip_cexe0_inst_vld_ex | The first CEXE instruction in block0 is in EX. The pipeline control unit uses this signal to register the attribute of cexe block0 and select the proper set of hardware flags. |
| isu_pip_cexe1_inst_vld_ex | The first CEXE instruction in block1 is in EX. The pipeline control unit uses this signal to register the attribute of cexe block1 and select the proper set of hardware flags. |

As indicated in FIG. 7A, the mechanism 700 includes write logic 702 for storing a value indicative of a condition specified by a first conditional execution instruction (i.e., an "attribute") of a first CE instruction group in a "CE1 attribute register" 704, and an attribute of a second CE instruction group in a "CE1 attribute register" 706. The CE0 attribute register 704 and the CE1 attribute register 706 are associated with the grouping (GR) pipeline stage. The CE0 attribute register 704 provides the stored attribute of the first CE instruction group to a "CE0 attribute queue" 720 described below, and the CE1 attribute register 706 provides the stored attribute of the second CE instruction group to a "CE1 attribute queue" 722 described below.

The mechanism 700 of FIGS. 7A-7B also includes a conditional execution (CE) marling queue 708. The CE marking queue 708 is associated with the grouping (GR) pipeline stage, and includes a "CE0 finite state machine (FSM)" 710, a "CE1 finite state machine (FSM)" 712, a control unit 714, a 6-entry marking queue 716, and a reordering multiplexer 718. In the embodiment of FIGS. 7A-7B, up to 6 instructions may be grouped together in the grouping (GR) pipeline stage and issued for execution simultaneously. The marking queue 716 has 6 entries, one for each of the 6 instructions that may be grouped together and issued for simultaneous execution.

In general, when one or more instructions grouped for simultaneous execution during the grouping (GR) pipeline stage, including one or more instructions of a CE instruction group, are written into the instruction queue 506 of FIG. 6, logic of the CE marking queue 708 generates marking data for the instructions, and stores the marking data, along with a unique tag assigned to the instruction, in the marking queue 716. The marking data includes a link pointer and identification (ID) data. In general, the link pointer for each instruction indicates whether the instruction is an instruction of a CE instruction group, and the identification (ID) data identifies a particular CE instruction group to which the instruction belongs. For example, if the ID data is '0' the instruction belongs to the '0' instruction group, and if the if the ID data is '1' the instruction belongs to the '1' instruction group.

In one embodiment, the link pointer for each instruction indicates the instruction is either: (i) not an instruction of a CE instruction group, (ii) a first instruction of a CE instruction group, (iii) an instruction of a CE instruction group, or (iv) a last instruction of a CE instruction group. These four possibilities can be encoded in a 2-bit link pointer value. For example, a link pointer value '00' may represent "not an instruction of a CE instruction group," a link pointer value '10' may represent "a first instruction of a CE instruction group," a link pointer value '01' may represent "an instruction of a CE instruction group," and a link pointer value '11' may represent "a last instruction of a CE instruction group."

In general, the CE0 FSM 710 keeps track of instructions of the first CE instruction group, and the CE1 FSM 712 keeps track of instructions of the second CE instruction group. The CE0 FSM 710 generates link pointer values and identification (ID) data for instructions grouped together for simultaneous execution and including at least one instruction of the first CE instruction group, and stores the tags assigned to the instructions, the link pointer values, and the identification (ID) values in the marking queue 716. The CE1 FSM 712 generates link pointer values and identification (ID) data for instructions grouped together for simultaneous execution and including at least one instruction of the second CE instruction group, and stores the tags assigned to the instructions, the link pointer values, and the identification (ID) values in the marking queue 716.

The CE0 FSM 710 and the CE1 FSM 712 are described in more detail below.

The CE0 attribute queue 720 includes a 6-entry queue 724, a queue write pointer (WP) 726, a queue read pointer (RP) 728, and a multiplexer 730. The 6-entry queue 724 is used to store attributes of up to 6 different CE instruction groups. As described above, the CE0 attribute register 704 is used to store an attribute of the first CE instruction group, and the CE0 attribute register 706 is used to store an attribute of the second CE instruction group. When one or more instructions, including one or more instructions of the first CE instruction group, are grouped with other instructions for simultaneous execution in the grouping (GR) pipeline stage, the attribute stored in the CE0 attribute register 704 is written into an available entry in the queue 724 of the CE0 attribute queue 720.

In the embodiment of FIG. 7A, the queue 724 is operated as a circular queue. A write pointer (WP) 726 is used to indicate an available entry at one end of a contiguous sequence of entries of the queue 724 used to store attributes, and a read pointer (RP) 728 is used to indicate an entry at the other end of the contiguous sequence of entries. When the write pointer 726 and the read pointer 728 indicate the same entry, no attributes are stored in the queue 724. The write pointer 726 is used to write attributes of CE instruction groups into available entries of the queue 724, and is updated during the write operation. When an instruction of a CE instruction group enters the execution (EX) pipeline stage, the read pointer 728 is used to control the multiplexer 730 such that the multiplexer 730 provides the attribute of the CE instruction group to the pipeline control unit 410 of FIG. 4. The read pointer 728 is updated when a last instruction of a CE instruction group is detected in the execution (EX) pipeline stage (and there is at least one valid entry in the queue 724).

In the embodiment of FIGS. 7A-7B, each of the 6 entries of the queue 724 includes a valid bit set when a conditional execution instruction grouped in the grouping (GR) pipeline stage enters the operand read (RD) pipeline stage. A valid bit corresponding to a given attribute value may be cleared, for example, when a last instruction of a CE instruction group, or a branch misprediction, is detected in the execution (EX) stage. It is noted that the valid bits are useful for operational verification purposes.

The CE1 attribute queue 722 is similar to the CE0 attribute queue 720, and includes a 6-entry queue 732, a queue write pointer (WP) 734, a queue read pointer (RP) 736, and a multiplexer 738. When one or more instructions, including one or more instructions of the first CE instruction group, are grouped with other instructions for simultaneous execution in the grouping (GR) pipeline stage, the attribute stored in the CE1 attribute register 706 is written into an available entry of the queue 732 of the CE1 attribute queue 722. A write pointer (WP) 734 is used to indicate an available entry at one end of a contiguous sequence of entries of the queue 732 used to store attributes, and a read pointer (RP) 736 is used to indicate an entry at the other end of the contiguous sequence of entries. When the write pointer 734 and the read pointer 736 indicate the same entry, no attributes are stored in the queue 732. The write pointer 734 is used to write attributes of CE instruction groups into available entries of the queue 732, and is updated during the write operation. When an instruction of a CE instruction group enters the execution (EX) pipeline stage, the read pointer 736 is used to control the multiplexer 738 such that the multiplexer 738 provides the attribute of the CE instruction group to the pipeline control unit 410 of FIG. 4. The read pointer 736 is updated when a last instruction of a CE instruction group is detected in the execution (EX) pipeline stage (and there is at least one valid entry in the queue 732).

It is noted that in the embodiment of FIGS. 7A-7B, only instructions of 2 CE instruction groups can be in any one pipeline stage at any given time. That is, at any given time there may be up to 5 pairs of conditional execution instruction groups; a pair in the operand read (RD) stage, a pair in the address generation (AG) stage, a pair in the memory access 0 (M0) stage, a pair in the memory access 1 (M1) stage, and a pair in the execution (EX) stage. Therefore, the 6-entry queue 724 of the CE0 attribute queue 720 and the 6-entry queue 732 of the attribute queue 722 cannot overflow.

In one embodiment, 7-bit attributes are stored in the CE0 attribute queue 720 and the CE1 attribute queue 722 as specified in Table 4 below:

TABLE 4

| Exemplary 7-Bit Attributes Stored in the CE0/1 Attribute Queue. | |
|---|---|
| Bit [6]: | 0 - Select flag register<br>1 - Select GPR register |
| Bit [5]: | 0 - Check for false condition<br>1 - Check for true condition |
| Bit [4]: | 0 - Do not update load/store pointers<br>1 - Update load/store pointers |
| Bit [3]: | 0 - Use hardware flag register<br>1 - Use static hardware flag register |
| Bit [2:0]: | 000 - <v> flag<br>001 - <gv> flag<br>010 - <sv> flag<br>011 - <gsv> flag<br>100 - <c> flag<br>101 - <ge> flag<br>110 - <gt> flag<br>111 - <z> flag |

As indicated in FIG. 7B, the mechanism 700 also includes conditional execution (CE) link pointer registers 740. The CE link pointer registers 740 are arranged as 5 sequential sets of 6 registers each, wherein outputs of the 6 registers of a preceding set feed inputs of 6 corresponding registers of a succeeding set. The 5 sets corresponding to the operand read (RD), the address generation (AG), the memory access 0 (M0), the memory access 1 (M1), and the execution (EX) pipeline stages, respectively.

Each of the 6 registers of each of the 5 sets corresponds to one of the 6 possible instructions that may be executed simultaneously (i.e., that may be in a given pipeline stage at the same time). Each register stores the link pointer values and the identification (ID) data of the corresponding instruction. The link pointers stored in the CE link pointer registers 740 are used to detect last instructions of CE instruction groups, and to update the read pointers 728 and 736 of the respective CE0 attribute queue 720 and CE1 attribute queue 722, during the execution (EX) pipeline stage. It is noted that in the embodiment of FIGS. 7A-7B, executions of instructions of CE instruction groups are non-interruptible. As a result, the link pointers of the CE link pointer registers 740 are needed to correctly terminate CE instruction groups.

The last set of 6 registers of the CE link pointer registers 740, corresponding to the execution (EX) pipeline stage, produces signals "isu_pip_cexe_vld_ex[5:0]," "isu_pip_cexe0_inst_vld_ex," "isu_pip_cexe1_inst_vld_ex," and "isu_pip_cexe_qid_ex[5:0]." The isu_pip_cexe_vld_ex[5:0] signal indicates whether one or more instructions of a CE instruction group are in the execution (EX) pipeline stage. (See Table 3.) The pipeline control unit 410 of FIG. 4 receives the isu_pip_cexe_vld_ex [5:0] signal, and uses the signal to determine whether results of the one or more instructions are to be saved or ignored (i.e., discarded) as described in more detail below. (See Table 3 above.)

The isu_pip_cexe0_inst_vld_ex signal is asserted when a first instruction of the first CE instruction group (i.e., cexe block0) is in the execution (EX) pipeline stage. The pipeline control unit 410 of FIG. 4 uses this signal to store the attribute of the first CE instruction group and select a proper set of hardware flags. (See Table 3 above.)

The isu_pip_cexe1_inst_vld_ex signal is asserted when a first instruction of the second CE instruction group (i.e., cexe block1) is in the execution (EX) pipeline stage. The pipeline control unit 410 of FIG. 4 uses this signal to store the attribute of the second CE instruction group and select a proper set of hardware flags. (See Table 3 above.)

The isu_pip_cexe_qid_ex[5:0] signal indicates which of the CE attribute queues 720 and 722 is storing the attribute of an instruction of a CE instruction group currently in the execution (EX) pipeline stage. The pipeline control unit 410 of FIG. 4 uses this information to generate one or more write enable signals. (See Table 3 above.)

Figure 8A:
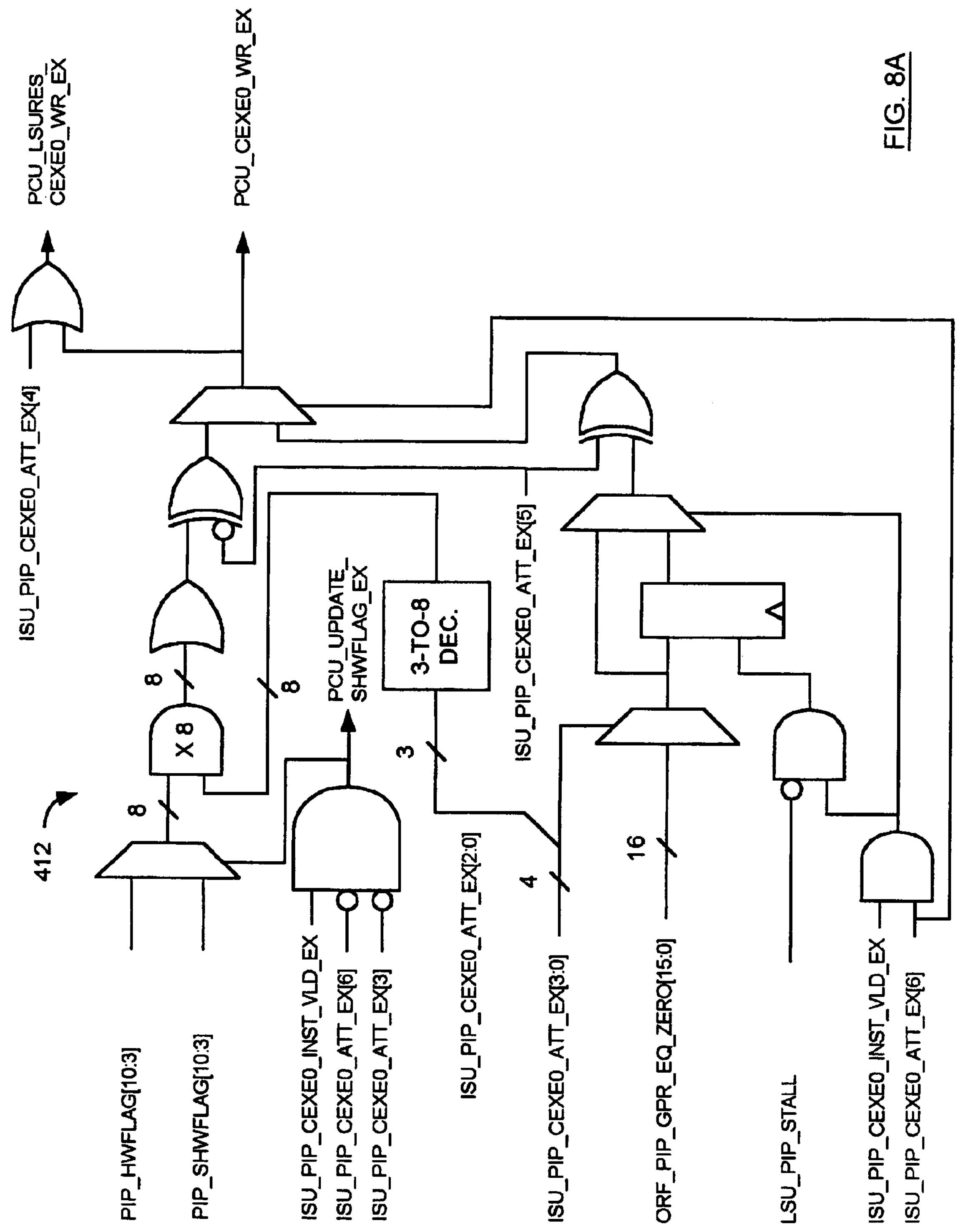
FIGS. 8A-8C in combination form a diagram of one embodiment of the write enable logic of FIG. 4.
Figure 8B:
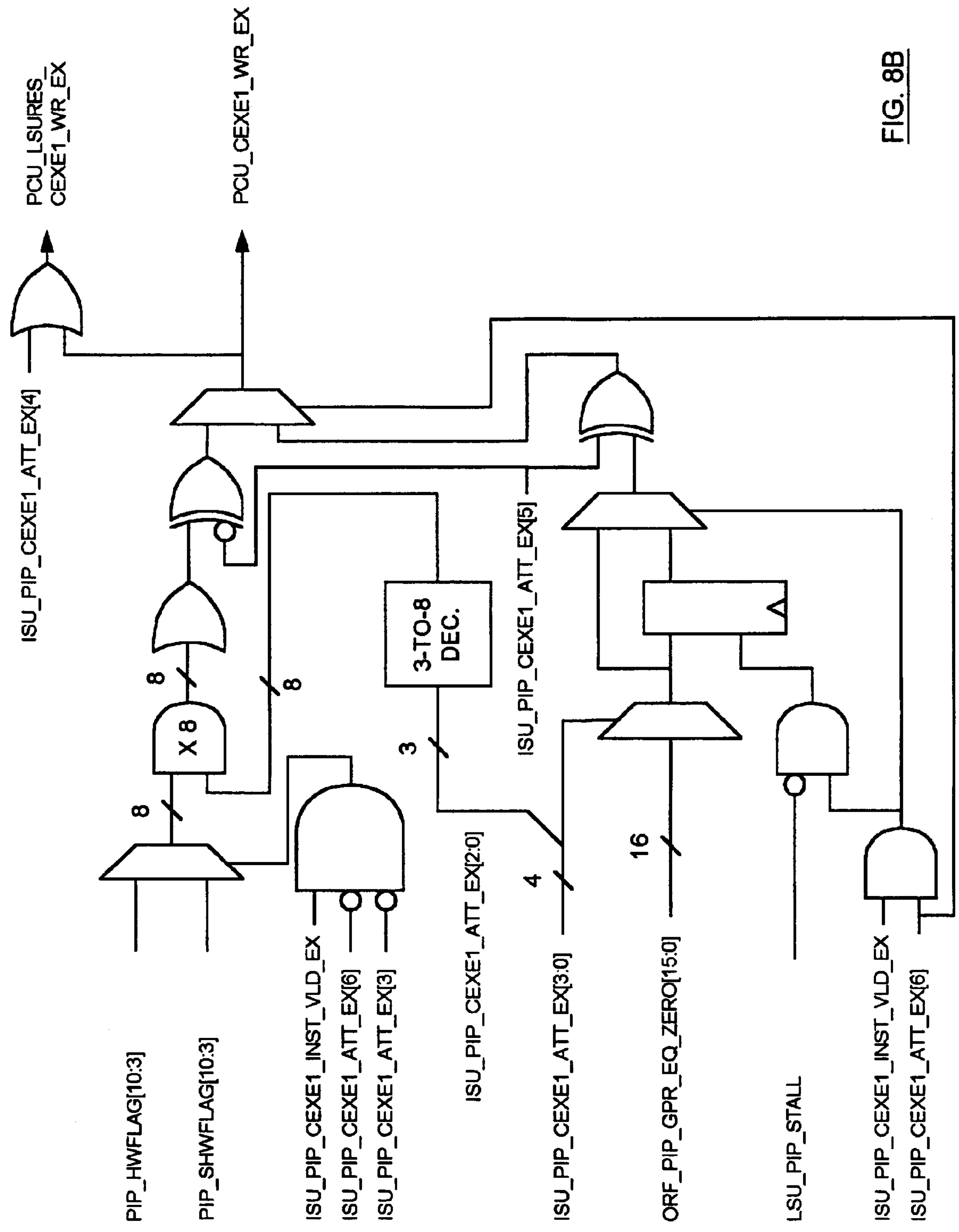
Figure 8C:
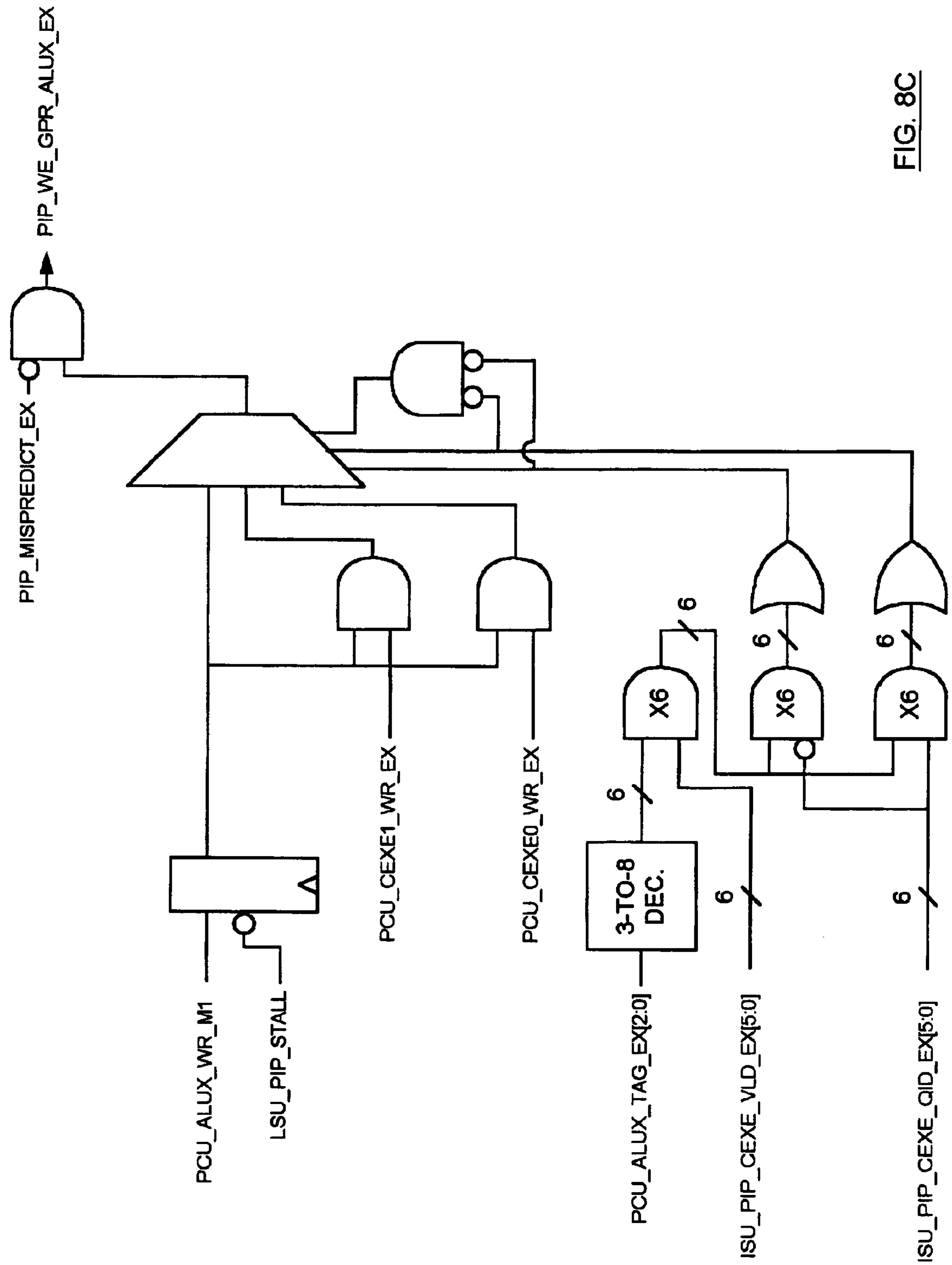

FIGS. 8A-8C in combination form a diagram of one embodiment of the write enable logic 412 of FIG. 4. In general, the write enable logic 412 receives signals conveying the attributes of each of the 2 CE instruction groups and other information, and produces multiple write enable signals. Each of the write enable signals corresponds to a different one of the 2 CE instruction groups, and is indicative of the existence of the condition specified by the conditional execution instruction of the corresponding conditional execution instruction group. The execution unit 406 of FIG. 4 receives the write enable signals, and saves a result of one or more instructions of each of the 2 CE instruction groups dependent upon the write enable signals.

Table 5 below lists input and output signals of the embodiment of the write enable logic 412 of FIGS. 8A-8C:

TABLE 5

Input and Output Signals of the Write Enable Logic 412 of FIGS. 8A-8C.

| Signal Name | Description |
|---|---|
| isu_pip_cexe_vld_ex[5:0] | This bus indicates there is one or more valid cexe instructions in EX pipeline stage. The pipeline control unit uses this information to determine whether a write enable logic associated with an instruction slot should be qualified with the cexe write enable logic. |
| isu_pip_cexe_qid_ex[5:0] | This bus indicates which CE attribute queue a current cexe instruction in EX pipeline stage is using. The pipeline control unit uses this information to select appropriate cexe write enable logic. |
| isu_pip_cexe0_inst_vld_ex | Asserted when the first cexe instruction in block0 is in the EX stage. The pipeline control unit uses this signal to register the attribute of cexe block0 and select the proper set of hardware flags. |
| isu_pip_cexe1_inst_vld_ex | Asserted when the first cexe instruction in block1 is in the EX stage. The pipeline control unit uses this signal to register the attribute of cexe block1 and select the proper set of hardware flags. |
| isu_pip_cexe0_att_ex[6:0] | Attribute corresponding to a cexe block0 in the EX pipeline stage. |
| isu_pip_cexe1_att_ex[6:0] | Attribute corresponding to a cexe block1 in the EX pipeline stage. |
| pip_hwflags[10:3] | Hardware flag bits:<br>Bit 10 (V): 32-bit overflow<br>Bit 9 (GV): 40-bit guard register overflow<br>Bit 8 (SV): 32-bit sticky overflow - same as V bit but may only be cleared by software.<br>Bit 7 (GSV): 40-bit guard register sticky overflow - same as GV bit but may only be cleared by software.<br>Bit 6 (C): Carry flag<br>Bit 5 (GE): Greater Than or Equal to flag<br>Bit 4 (GT): Greater Than flag<br>Bit 3 (Z): Equal to Zero flag |
| pip_shwflags[10:3] | Static hardware flag bits:<br>Bit 10 (V): 32-bit overflow<br>Bit 9 (GV): 40-bit guard register overflow<br>Bit 8 (SV): 32-bit sticky overflow - same as V bit but may only be cleared by software.<br>Bit 7 (GSV): 40-bit guard register sticky overflow - same as GV bit but may only be cleared by software.<br>Bit 6 (C): Carry flag<br>Bit 5 (GE): Greater Than or Equal to flag<br>Bit 4 (GT): Greater Than flag<br>Bit 3 (Z): Equal to Zero flag |
| orf_pip_grp_eq_zero[15:0] | Bit 15 - R15 (GPR 15) is equal to zero.<br>Bit 14 - R14 is equal to zero.<br>Bit 13 - R13 is equal to zero.<br>Bit 12 - R12 is equal to zero.<br>Bit 11 - R11 is equal to zero.<br>Bit 10 - R10 is equal to zero.<br>Bit 9 - R9 is equal to zero.<br>Bit 8 - R8 is equal to zero.<br>Bit 7 - R7 is equal to zero.<br>Bit 6 - R6 is equal to zero. |

TABLE 5-continued

Input and Output Signals of the Write Enable Logic 412 of FIGS. 8A-8C.

| Signal Name | Description |
|---|---|
| | Bit 5 - R5 is equal to zero.<br>Bit 4 - R4 is equal to zero.<br>Bit 3 - R3 is equal to zero.<br>Bit 2 - R2 is equal to zero.<br>Bit 1 - R1 is equal to zero.<br>Bit 0 - R0 is equal to zero. |
| pcu_alu0_tag_ex[2:0] | Tag for instruction in the ALU0 unit in the EX stage. |
| pcu_alu1_tag_ex[2:0] | Tag for instruction in the ALU1 unit in the EX stage. |
| pip_we_gpr_alu0_ex | ALU0 write enable signal. |
| pip_we_gpr_alu1_ex | ALU1 write enable signal. |
| pcu_update_shwflag_ex | Every time a dynamic CEXE instruction is executed, the shwflag is updated with the contents of the hwflag register. This signal is used to update the shwflag register in the PIP unit. |
| lsu_pip_stall | Used to freeze the execution pipeline. When this signal is asserted, all registers remain unchanged. |
| pcu_lsures_cexe0_wr_ex | Used to update the load/store unit (LSU) address pointer. NOTE: When isu_pip_cexe0_att_ex[4] is asserted, the address pointer is updated regardless of the CEXE block0 condition. |
| pcu_cexe0_wr_ex | The write enable signal for CEXE block0. It is asserted when a CEXE condition for block0 is met. |
| isu_pip_cexe1_inst_vld_ex | The first CEXE instruction in block1 is in EX. The pipeline control unit uses this signal to register the attribute of cexe block1 and select the proper set of hardware flags. |
| pcu_lsures_cexe1_wr_ex | Used to update the LSU address pointer. NOTE: When isu_pip_cexe1_att_ex[4] is true, the address pointer is updated regardless of the CEXE block1 condition. |
| pcu_cexe1_wr_ex | The write enable signal for CEXE block1. It is asserted when a CEXE condition for block1 is met. |
| pcu_alux_wr_m1 | This is either pcu_alu0_wr_m1 or pcu_alu1_wr_m1. This signal indicates that the result generated by the corresponding arithmetic logic unit (ALU) is going to be written into the register file. If there is a functional unit that is also updating the same register, write arbitration logic decides which instruction will win. This logic is based on the order of the instruction tags. |
| pip_mispredict_ex | This signal indicates a conditional branch was mispredicted. This means that all the instructions that follow the branch up to this point should be flushed, or discarded. |

A first portion of the write enable logic 412 shown in FIG. 8A is associated with the first CE instruction group (i.e., "cexe0" instructions). The first portion of the write enable logic 412 receives signals pertaining to the cexe0 instructions, and produces signals "pcu_lsures_cexe0_wr_ex" and "pcu_cexe0_wr_ex." The pcu_lsures_cexe0_wr_ex signal is used to generate one or more pointer write enable signals for one or more load/store units (LSUs) in the load/store unit 404 of FIG. 4. For example, the one or more LSUs may include address pointers and write logic that uses the pcu_lsures_cexe0_wr_ex signal to update the address pointers. The pcu_cexe0_wr_ex signal is used to generate one or more write enable signals for one or more arithmetic logic units (ALUs) and/or one or more multiply accumulate units (MAUs) in the execution unit 406 of FIG. 4, and/or the one or more load/store units (LSUs) in the load/store unit 404 of FIG. 4. (See Table 5 above.)

A second portion of the write enable logic 412 shown in FIG. 8B is associated with the second CE instruction group (i.e., "cexe1" instructions). The second portion of the write enable logic 412 receives signals pertaining to the cexe1 instructions, and produces signals "pcu_lsures_cexe1_wr_ex" and "pcu_cexe1_wr_ex." The pcu_lsures_cexe1_wr_ex signal is used to generate one or more pointer write enable signals for one or more load/store units (LSUs) in the load/store unit 404 of FIG. 4. For example, the one or more LSUs may include address pointers and write logic that uses the pcu_lsures_cexe1_wr_ex signal to update the address pointers. The pcu_cexe1_wr_ex signal is used to generate one or more write enable signals for one or more arithmetic logic units (ALUs) and/or one or more multiply accumulate units (MAUs) in the execution unit 406 of FIG. 4, and/or the one or more load/store units (LSUs) in the load/store unit 404 of FIG. 4. (See Table 5 above.)

A third portion of the write enable logic 412 shown in FIG. 8C represents two similar logic circuits. A first of the two logic circuits receives signals wherein "alux" is equal to "alu0," and produces a "pip_we_gpr_alu0_ex" signal. The pip_we_gpr_alu0_ex signal is a write enable signal corresponding to a result produced by a first arithmetic logic unit "ALU0" of the execution unit 406 of FIG. 4. (See Table 5 above.) For example, when the pip_we_gpr_alu0_ex signal is asserted, the result produced by the ALU0 may be saved, and when the pip_we_gpr_alu0_ex signal is deasserted, the result produced by the ALU0 may be the ignored (i.e., discarded).

The second logic circuit represented by the third portion of the write enable logic 412 shown in FIG. 8C receives signals wherein "alux" is equal to "alu1," and produces a "pip_we_gpr_alu1_ex" signal. The pip_we_gpr_alu1_ex signal is a write enable signal corresponding to a result produced by a second arithmetic logic unit "ALU1" of the execution unit 406 of FIG. 4. (See Table 5 above.) For example, when the pip_we_gpr_alu1_ex signal is asserted, the result produced by the ALU1 may be saved, and when the pip_we_grp_alu1_ex signal is deasserted, the result produced by the ALU1 may be the ignored (i.e., discarded).

It is noted that in one embodiment of the processor core 104 of FIGS. 1 and 4, the write enable logic 412 of FIG. 4 also includes logic similar to that shown in FIGS. 8A-8C and described above to produce write enable signals for 2 multiply accumulate units (MAUs) located in the execution unit 406 of FIGS. 4, and 2 load/store units (LSUs) located in the load/store unit 404 of FIG. 4.

Figure 9:
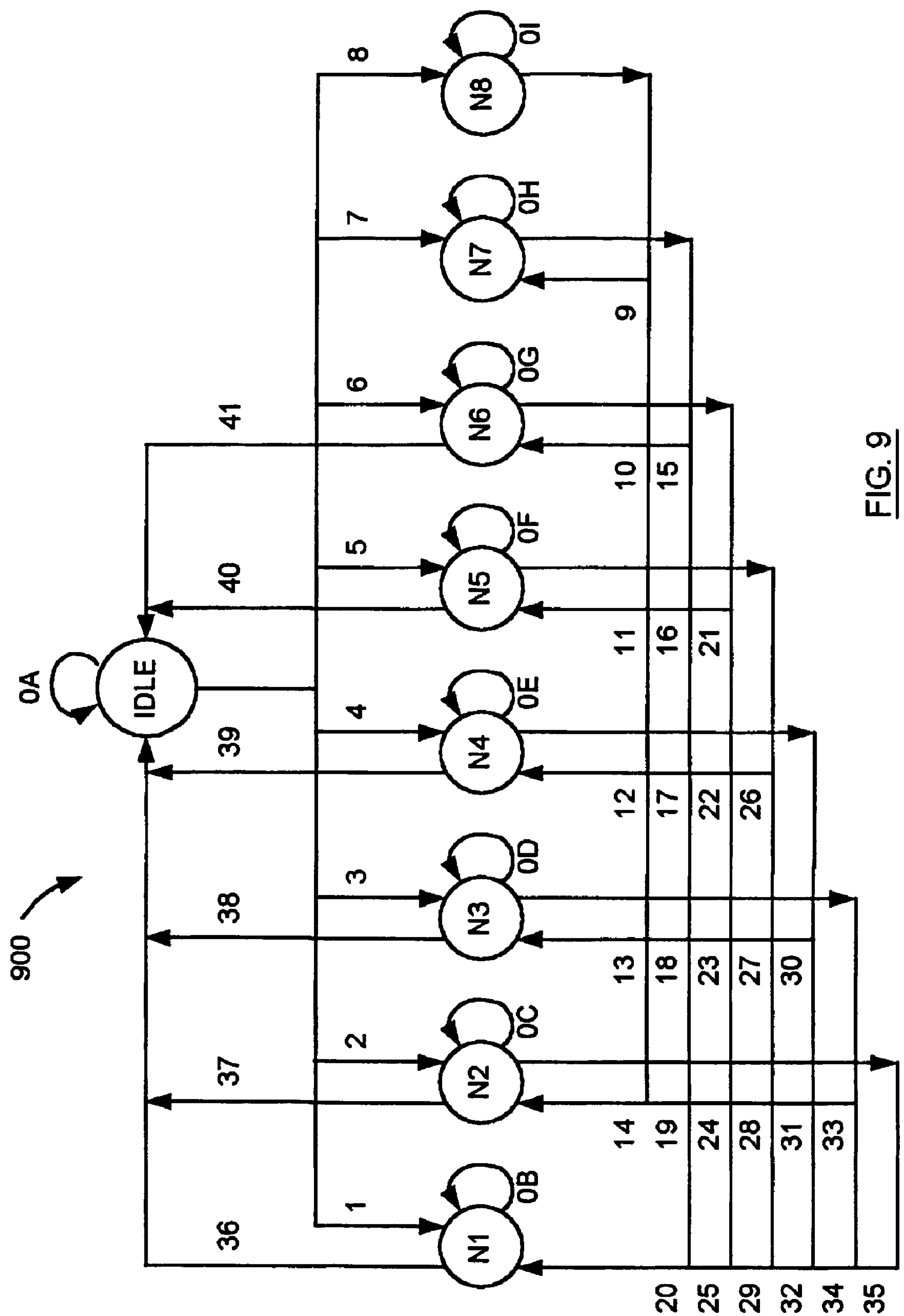
FIG. 9 is a state diagram of a finite state machine embodied within the first and second finite state machines of FIG. 7A.

FIG. 9 is a state diagram of a finite state machine 900 embodied within the CE0 FSM 710 and the CE1 FSM 712 of FIG. 7A. As indicated in FIG. 9, the finite state machine 900 has nine states: Idle, N1, N2, N3, N4, N5, N6, N7 and N8. The states and transitions of the finite state machine 900 are best understood by examining Table 6 below while referencing FIG. 9:

TABLE 6

State Table for the Finite State Machine 900 of FIG. 9.

| State | Instructions 0-5 Entering The GR Stage During the Next Cycle (0 = No, 1 = Yes, x = don't care) 012345 | Next State | FIG. 9 Ref. No. |
|---|---|---|---|
| N1 | 000000 | N1 | 0B |
| N1 | 1xxxxx | Idle | 36 |
| N2 | 000000 | N2 | 0C |
| N2 | 100000 | N1 | 35 |
| N2 | 11xxxx | Idle | 37 |
| N3 | 000000 | N3 | 0D |
| N3 | 100000 | N2 | 33 |
| N3 | 110000 | N1 | 34 |
| N3 | 111xxx | Idle | 38 |
| N4 | 000000 | N4 | 0E |
| N4 | 100000 | N3 | 30 |
| N4 | 110000 | N2 | 31 |
| N4 | 111000 | N1 | 32 |
| N4 | 1111xx | Idle | 39 |
| N5 | 000000 | N5 | 0F |
| N5 | 100000 | N4 | 26 |
| N5 | 110000 | N3 | 27 |
| N5 | 111000 | N2 | 28 |
| N5 | 111100 | N1 | 29 |
| N5 | 11111x | Idle | 40 |
| N6 | 000000 | N6 | 0G |
| N6 | 100000 | N5 | 21 |
| N6 | 110000 | N4 | 22 |
| N6 | 111000 | N3 | 23 |
| N6 | 111100 | N2 | 24 |
| N6 | 111110 | N1 | 25 |
| N6 | 111111 | Idle | 41 |
| N7 | 000000 | N7 | 0H |
| N7 | 100000 | N6 | 15 |
| N7 | 110000 | N5 | 16 |
| N7 | 111000 | N4 | 17 |
| N7 | 111100 | N3 | 18 |
| N7 | 111110 | N2 | 19 |
| N7 | 111111 | N1 | 20 |
| N8 | 000000 | N8 | 0I |
| N8 | 100000 | N7 | 9 |
| N8 | 110000 | N6 | 10 |
| N8 | 111000 | N5 | 11 |
| N8 | 111100 | N4 | 12 |
| N8 | 111110 | N3 | 13 |
| N8 | 111111 | N2 | 14 |

In general, the finite state machine 900 keeps track of instructions of a particular CE instruction group. The finite state machine 900 generates marking data for instructions grouped together for simultaneous execution and including at least one instruction of the CE instruction group, and stores the marking data in the marking queue 716 of FIG. 7A.

Additional details of conditional instruction execution will now be described. Referring to FIGS. 1 and 4, the conditional execution instruction 110 is typically one of several instructions (e.g., 6 instructions) fetched from the memory system 106 by the instruction unit 400 and decoded during the fetch/decode (FD) stage. During the execution (EX) stage of the conditional execution instruction 110, the register specified by the conditional execution instruction 110 (e.g., a flag register or one of the general purpose registers) is accessed. The execution unit 406 may test the specified register for the specified condition, and provide a comparison result to the pipeline control unit 410.

As described above, if the conditional execution instruction 110 specifies the hardware flag register, the values of the flag bits in the hardware flag register are copied to the corresponding flag bits in the static hardware flag register. For example, if the conditional execution instruction 110 specifies the hardware flag register, the pipeline control unit 410 may produce a signal that causes the values of the flag bits in the hardware flag register to be copied to the corresponding flag bits in the static hardware flag register.

During the execution (EX) stage of each of the instructions of the code block 112, the pipeline control unit 410 may provide a first signal and a second signal to the execution unit 406. The first signal may be indicative of the value of the pointer update bit 206 of the conditional execution instruction 110 specifying the code block 112, and the second signal may be indicative of whether the specified condition existed in the specified register during the execution (EX) stage of the conditional execution instruction 110. The second signal may be, for example, a write enable signal produced by the write enable logic 412 of FIG. 4.

During the execution (EX) stage of a load/store with update instruction of the code block 112, if the first signal indicates that the pointer update bit 206 of the conditional execution instruction 110 specifies that the pointer used in the load/store instruction is to be updated unconditionally, that is independent of the condition specified by the conditional execution instruction 110, the execution unit 406 updates the pointer used in the load/store instruction.

On the other hand, if the first signal indicates that the pointer update bit 206 of the conditional execution instruction 110 specifies that the pointer used in the load/store instruction is to be updated only if the condition specified by the conditional execution instruction 110 is true, the execution unit 406 updates the pointer used in the load/store instruction dependent upon the second signal. If the second signal indicates the specified condition existed in the specified register during the execution (EX) stage of the conditional execution instruction 110, the execution unit 406 updates the pointer used in the load/store instruction. On the other hand, if the second signal indicates that the specified condition did not exist in the specified register during the execution (EX) stage of the conditional execution instruction 110, the execution unit 406 does not update the pointer used in the load/store instruction.

During the execution (EX) stage of each of the instructions of the code block 112, the execution unit 406 saves results of the instructions of the code block 112 dependent upon the second signal provided by the pipeline control unit 410. As described above, the second signal may be, for example, a write enable signal produced by the write enable logic 412 of FIG. 4. For example, during the execution (EX) stage of a particular one of the instructions of the code block 112, if the second signal received from the pipeline control unit 410 indicates the specified condition existed in the specified register during the execution (EX) stage of the conditional execution instruction 110, the execution unit 406 provides the results of the instruction to the register file 408. On the other hand, if the second signal indicates the specified condition did not exist in the specified register during the execution (EX) stage of the conditional execution instruction 110, the execution unit 406 does not provide the results of the instruction to the register file 408.

If the condition specified by the conditional execution instruction 110 of FIG. 1 is true, the results of the instructions making up the code block 112 of FIG. 1 are qualified, and the results are written to the register file 408 during the corresponding execution (EX) stages. If the specified condition is not true, the results of the instructions of the code block 112 are not qualified, and are not written to the register file 408 during the corresponding execution stages (i.e., are ignored).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What we claim as our invention is:

1. A processor, comprising:

a plurality of attribute queues, each attribute queue further including a plurality of queue entries, wherein:

a corresponding queue entry from each of said plurality of attribute queues are simultaneously assignable to each of a first plurality of conditional execution instruction groups, a second corresponding queue entry from each of said plurality of attribute queues are assignable at a later time to each of a second plurality of conditional execution instruction groups, a link pointer to at least one conditional execution instruction group can also be provided to a same stage with a link pointer to at least one other grouped instruction for simultaneous execution of said one other grouped instruction with said at least one instruction of the conditional instruction group, wherein each conditional execution instruction group has both a conditional execution instruction and a code block, wherein each queue entry of its corresponding attribute queue is configured to store an attribute of the conditional execution instruction of its assigned conditional execution instruction group, wherein the attribute comprises a value indicative of a condition specified by a conditional execution instruction of the assigned conditional execution instruction group, and wherein a result of each of the at least one instruction of the code block of the conditional execution instruction group is saved dependent upon the existence of the specified condition in the processor stored in the queue entry during execution of the conditional execution instruction.

2. The processor as recited in claim 1, wherein the corresponding number of conditional execution instruction groups reside in a section of code retrieved by the processor from a memory system.

3. The processor as recited in claim 1, wherein each of the corresponding number of conditional execution instruction groups comprises a conditional execution instruction and a code block specified by the conditional execution instruction, wherein the code block comprises at least one instruction.

4. The processor as recited in claim 1, wherein each of the attribute queues comprises a plurality of entries and is operated as a circular queue.

5. The processor as recited in claim 1, wherein each of the attribute queues is configured to produce the stored attribute of a given one of the assigned conditional execution instruction groups when an instruction of the given one of the assigned conditional execution instruction groups enters an execution stage of an execution pipeline implemented within the processor.

6. The processor as recited in claim 1, wherein each of the attribute queues comprises a read pointer updated when a last instruction of a given one of the assigned conditional execution instruction groups is in an execution stage of an execution pipeline implemented within the processor.

7. The processor of claim 1, wherein the attribute further includes at least one selected from the group consisting of:

a select bit;

a pointer update bit; and a condition specification field.

8. The processor of claim 1, wherein a maximum of two conditional execution instruction groups can be in any one pipeline stage at any given time.

9. The processor of claim 8, wherein there are up to five pairs of conditional execution groups in the pipeline stages: a pair in an operand (RD) stage, a pair in an address generation (AG) stage, a pair in a memory access 0 (M0) stage, a pair in a memory access 1 (M1) stage, and a pair in an execution (EX) stage.

10. The processor of claim 9, wherein a number of queue entries is greater than five.

11. The processor of claim 1, wherein the second queue entry from each of the plurality of attribute queues are simultaneously assignable at the later time to each of the second plurality of conditional execution instruction groups.

* * * * *